United States Patent
Wu et al.

(10) Patent No.: US 12,402,130 B2
(45) Date of Patent: *Aug. 26, 2025

(54) METHOD AND DEVICE IN NODES USED FOR WIRELESS COMMUNICATION

(71) Applicant: BUNKER HILL TECHNOLOGIES LLC, Allen, TX (US)

(72) Inventors: Keying Wu, Shanghai (CN); Xiaobo Zhang, Shanghai (CN)

(73) Assignee: BUNKER HILL TECHNOLOGIES LLC, Allen, TX (US)

( * ) Notice: Subject to any disclaimer, the term of this patent is extended or adjusted under 35 U.S.C. 154(b) by 281 days.

This patent is subject to a terminal disclaimer.

(21) Appl. No.: 18/116,850

(22) Filed: Mar. 3, 2023

(65) Prior Publication Data
US 2023/0209550 A1 Jun. 29, 2023

Related U.S. Application Data

(63) Continuation of application No. 17/019,357, filed on Sep. 14, 2020, now Pat. No. 11,617,194.

(30) Foreign Application Priority Data

Nov. 6, 2019 (CN) .......................... 201911074376.6

(51) Int. Cl.
*H04W 72/20* (2023.01)
*H04L 5/00* (2006.01)
*H04W 4/40* (2018.01)

(52) U.S. Cl.
CPC ........... *H04W 72/20* (2023.01); *H04L 5/0005* (2013.01); *H04W 4/40* (2018.02)

(58) Field of Classification Search
None
See application file for complete search history.

(56) References Cited

U.S. PATENT DOCUMENTS

| 2007/0297451 A1* | 12/2007 | Kim | ...................... H04L 1/0083 370/469 |
| 2019/0068313 A1 | 2/2019 | Lyu | |
| 2019/0207730 A1 | 7/2019 | Park | |

FOREIGN PATENT DOCUMENTS

| CN | 107295702 A | 10/2017 |
| CN | 107302423 A | 10/2017 |

(Continued)

OTHER PUBLICATIONS

Motorola Mobility and MCCTF160 R5-172503 "Corrections to eMTC MAC TBS test case for amp;quot;UL-SCH transport block size selection / DCI format 6-0B amp;quot;" 3GPP TSG RAN WG5_TEST_EX_T1 May 15, 2017.

(Continued)

*Primary Examiner* — Nicholas Sloms
(74) *Attorney, Agent, or Firm* — Ascenda Law Group, PC

(57) ABSTRACT

The present disclosure provides a method and a device in a node for wireless communications. A first node receives a first signaling and a first signal in a first time-frequency resource pool; the first signaling comprises scheduling information of the first signal; the first signal carries a first bit block, the first bit block comprising a positive integer number of binary bits; a first value is used for determining a number of binary bits comprised in the first bit block, and the first value is related to the first time-frequency resource pool. The above method helps prevent both sides of communications from different interpretations of Transport Block Size in V2X communications, thus ensuring communication quality and avoiding extra signaling overhead.

20 Claims, 23 Drawing Sheets

(56) References Cited

FOREIGN PATENT DOCUMENTS

| CN | 108988983 A | 12/2018 |
|---|---|---|
| CN | 109245869 A | 1/2019 |
| CN | 110166164 A | 8/2019 |
| WO | 2018024206 A1 | 2/2018 |
| WO | 2018072615 A1 | 4/2018 |
| WO | 2018152821 A1 | 8/2018 |

OTHER PUBLICATIONS

Final Report of 3GPP TSG RAN WG1 #72 v1.0.0 R1-130861 (St Julian's, Malta, Jan. 28-Feb. 1, 2013).
Final Report of 3GPP TSG RAN WG1 #75 v1.0.0 R1-140001 (San Francisco, USA, Nov. 11-15, 2013).
Final Report of 3GPP TSG RAN WG1 #80 v1.0.0 R1-151454 (Athens, Greece, Feb. 9-13, 2015).
3GPP TR 22.886 V15.3.0 (Sep. 2018).
3GPP TS 38.212 V15.7.0 (Sep. 2019).
3GPP TS 38.214 V15.7.0 (Sep. 2019).

\* cited by examiner

Cast type of first signal $\xrightarrow{\text{used for determining}}$ First value

FIG. 12

Priority of first signal $\xrightarrow{\text{used for determining}}$ First value

FIG. 13

A number of frequency-
domain resource blocks
allocated to first signal

First-type value = fourth-type value × first parameter − second overhead

Fourth-type value = min (fifth-type value, first threshold)

First value

FIG. 16

Second-type value = max (first-type integer, second threshold)

Reference value = first-type value − first bit number

FIG. 17

| Second signaling set | scheduling information of second signal set | ... |
|---|---|---|

FIG. 21

METHOD AND DEVICE IN NODES USED FOR WIRELESS COMMUNICATION

CROSS REFERENCE TO RELATED APPLICATIONS

This application is the continuation of the U.S. patent application Ser. No. 17/019,375, filed on Sep. 14, 2020, which claims the priority benefit of Chinese Patent Application No. 201911074376.6, filed on Nov. 6, 2019, the full disclosure of which is incorporated herein by reference.

BACKGROUND

Technical Field

The present disclosure relates to transmission methods and devices in wireless communication systems, and in particular to a sidelink-relevant transmission method and device in wireless communications.

Related Art

Application scenarios of future wireless communication systems are becoming increasingly diversified, and different application scenarios have different performance demands on systems. In order to meet different performance requirements of various application scenarios, the $3^{rd}$ Generation Partner Project (3GPP) Radio Access Network (RAN) #72 plenary decided to conduct the study of New Radio (NR), or what is called fifth Generation (5G). The work Item (WI) of NR was approved at the 3GPP RAN #75 plenary to standardize the NR.

In response to rapidly growing Vehicle-to-Everything (V2X) traffic, 3GPP has started standards setting and research work under the framework of NR. Currently, 3GPP has completed planning work targeting 5G V2X requirements and has included these requirements into standard TS22.886, where 3GPP identifies and defines 4 major Use Case Groups, covering cases of Vehicles Platooning, supporting Extended Sensors, Advanced Driving and Remote Driving. At 3GPPRAN #80 Plenary, the technical Study Item (SI) of NR V2X has already started.

SUMMARY

When frequency spectrum resources are shared by a V2X system and a cellular system, the V2X system will have no access to resources in the cellular networks configured for downlink transmission. Inventors find through researches that the size of time-domain resources available for V2X transmission is variable since configurations of transmission formats of different sub-frames or slots may vary a lot in the cellular system, which may lead to a disagreement between both sides of communications on the determination of Transport Block Size (TB S) in multiple transmissions. Given that the missed detection rate may increase sharply due to the influence of half-duplex in the V2X system, the seriousness of the above problem will be more apparent.

To address the above problem, the present disclosure proposes a solution. It should be noted that the present disclosure is not only applicable to the V2X communication scenario exemplified above, but is applicable to other cellular communication scenarios, in which similar technical effects can be achieved. In addition, employing a scheme that applies to all kinds of scenarios (including but not limited to V2X communications and cellular communications) also contributes to reducing hardcore complexity and costs. The embodiments of a first node of the present disclosure and the characteristics in the embodiments may be applied to a second node if no conflict is incurred, and vice versa. In the case of no conflict, the embodiments of the present disclosure and the characteristics in the embodiments may be combined with each other arbitrarily.

The present disclosure provides a method in a first node for wireless communications, comprising:
  receiving a first signaling in a first time-frequency resource pool; and
  receiving a first signal in the first time-frequency resource pool;
  herein, the first signaling comprises scheduling information of the first signal; the first signal carries a first bit block, the first bit block comprising a positive integer number of binary bits; a first value is used for determining a number of binary bits comprised in the first bit block, and the first value is related to the first time-frequency resource pool.

In one embodiment, a problem to be solved in the present disclosure includes how to prevent misinterpretations of TBS on both sides of V2X communications. By associating a time-frequency resource pool and the TBS, the above method manages to solve the problem.

In one embodiment, the above method is characterized in that the first value is a reference value of a number of multicarrier symbols, and the first bit block is a Transport Block (TB), the first value rather than a number of multicarrier symbols actually occupied by the first signal is used for calculating the Transport Block Size (TBS) of the first bit block.

In one embodiment, the above method is advantageous in preventing both sides of communications from interpreting the TB S differently, thus guaranteeing communication quality and avoiding excess signaling overhead.

According to one aspect of the present disclosure, wherein the first time-frequency resource pool is a candidate time-frequency resource pool among K candidate time-frequency resource pools, K being a positive integer greater than 1; K value sets respectively correspond to the K candidate time-frequency resource pools, any of the K value sets comprising a positive integer number of value(s); a first value set is one of the K value sets that corresponds to the first time-frequency resource pool, the first value being a value in the first value set.

According to one aspect of the present disclosure, wherein a cast type of the first signal is used for determining the first value.

According to one aspect of the present disclosure, wherein a priority of the first signal is used for determining the first value.

According to one aspect of the present disclosure, comprising:
  receiving a first information block;
  herein, the first information block indicates the first time-frequency resource pool.

According to one aspect of the present disclosure, wherein the first value and a number of frequency-domain resource blocks allocated to the first signal are jointly used for determining a first-type value, wherein the first-type value is used for determining a second-type value, and the second-type value is used for determining the number of the binary bits comprised in the first bit block.

According to one aspect of the present disclosure, comprising:
  receiving a second signaling set and a second signal set in the first time-frequency resource pool;

herein, the second signaling set comprises a positive integer number of signaling(s), and the second signal set comprises a positive integer number of signal(s); each signaling in the second signaling set comprises scheduling information of a signal in the second signal set, while each signal in the second signal set carries the first bit block.

According to one aspect of the present disclosure, wherein the first node is a UE.

According to one aspect of the present disclosure, wherein the first node is a relay node.

The present disclosure provides a method in a second node for wireless communications, comprising:

transmitting a first signaling in a first time-frequency resource pool; and transmitting a first signal in the first time-frequency resource pool;

herein, the first signaling comprises scheduling information of the first signal; the first signal carries a first bit block, the first bit block comprising a positive integer number of binary bits; a first value is used for determining a number of binary bits comprised in the first bit block, and the first value is related to the first time-frequency resource pool.

According to one aspect of the present disclosure, wherein the first time-frequency resource pool is a candidate time-frequency resource pool among K candidate time-frequency resource pools, K being a positive integer greater than 1; K value sets respectively correspond to the K candidate time-frequency resource pools, any of the K value sets comprising a positive integer number of value(s); a first value set is one of the K value sets that corresponds to the first time-frequency resource pool, the first value being a value in the first value set.

According to one aspect of the present disclosure, wherein a cast type of the first signal is used for determining the first value.

According to one aspect of the present disclosure, wherein a priority of the first signal is used for determining the first value.

According to one aspect of the present disclosure, comprising:

transmitting a first information block;

herein, the first information block indicates the first time-frequency resource pool.

According to one aspect of the present disclosure, wherein the first value and a number of frequency-domain resource blocks allocated to the first signal are jointly used for determining a first-type value, wherein the first-type value is used for determining a second-type value, and the second-type value is used for determining the number of the binary bits comprised in the first bit block.

According to one aspect of the present disclosure, comprising:

transmitting a second signaling set and a second signal set in the first time-frequency resource pool;

herein, the second signaling set comprises a positive integer number of signaling(s), and the second signal set comprises a positive integer number of signal(s); each signaling in the second signaling set comprises scheduling information of a signal in the second signal set, while each signal in the second signal set carries the first bit block.

According to one aspect of the present disclosure, wherein the second node is a UE.

According to one aspect of the present disclosure, wherein the second node is a relay node.

The present disclosure provides a first node for wireless communications, comprising:

a first receiver, receiving a first signaling and a first signal in a first time-frequency resource pool;

herein, the first signaling comprises scheduling information of the first signal; the first signal carries a first bit block, the first bit block comprising a positive integer number of binary bits; a first value is used for determining a number of binary bits comprised in the first bit block, and the first value is related to the first time-frequency resource pool.

The present disclosure provides a second node for wireless communications, comprising:

a first transmitter, transmitting a first signaling and a first signal in a first time-frequency resource pool;

herein, the first signaling comprises scheduling information of the first signal; the first signal carries a first bit block, the first bit block comprising a positive integer number of binary bits; a first value is used for determining a number of binary bits comprised in the first bit block, and the first value is related to the first time-frequency resource pool.

In one embodiment, the present disclosure is advantageous over the prior art in the following aspect:

Preventing a disagreement between both sides of communications over determining the Transport Block Size (TBS) in V2X communications, thereby guaranteeing the communication quality and avoiding extra signaling overhead.

BRIEF DESCRIPTION OF THE DRAWINGS

Other features, objects and advantages of the present disclosure will become more apparent from the detailed description of non-restrictive embodiments taken in conjunction with the following drawings:

FIG. 12 illustrates a schematic diagram of a cast type of a first signal being used for determining a first value according to one embodiment of the present disclosure.

FIG. 13 illustrates a schematic diagram of a priority of a first signal being used for determining a first value according to one embodiment of the present disclosure.

FIG. 16 illustrates a schematic diagram of a first value and a number of frequency-domain resource blocks allocated to a first signal being used for determining a first-type value according to one embodiment of the present disclosure.

FIG. 17 illustrates a schematic diagram of a first-type value being used for determining a second-type value according to one embodiment of the present disclosure.

FIG. 21 illustrates a schematic diagram of a second signaling set and a second signal set according to one embodiment of the present disclosure.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
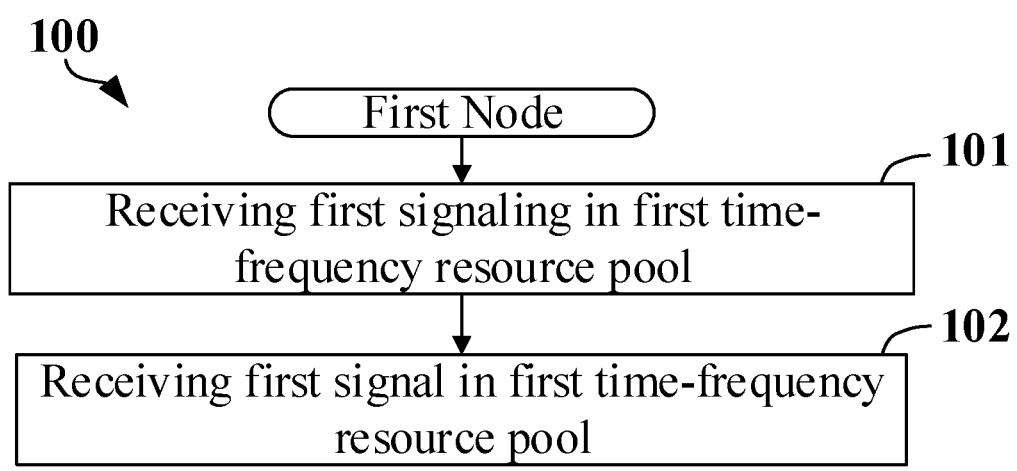
FIG. 1 illustrates a flowchart of a first signaling and a first signal according to one embodiment of the present disclosure.

Embodiment 1 illustrates a flowchart of a first signaling and a first signal according to one embodiment of the present disclosure, as shown in FIG. 1. In step 100 illustrated by FIG. 1, each box represents a step. Particularly, the ordering of steps marked by the boxes do not necessarily represent specific chronological sequence of each step.

In Embodiment 1, the first node in the present disclosure receives a first signaling in a first time-frequency resource pool in step 101; receives a first signal in the first time-frequency resource pool in step 102. Herein, the first signaling comprises scheduling information of the first signal; the first signal carries a first bit block, the first bit block comprising a positive integer number of binary bits; a first value is used for determining a number of binary bits comprised in the first bit block, and the first value is related to the first time-frequency resource pool.

In one embodiment, the first signaling is a dynamic signaling.

In one embodiment, the first signaling is a Layer 1 (L1) signaling.

In one embodiment, the first signaling is a L1 control signaling.

In one embodiment, the first signaling comprises Sidelink Control Information (SCI).

In one embodiment, the first signaling comprises one or more fields of a piece of SCI.

In one embodiment, the first signaling comprises Downlink Control Information (DCI).

In one embodiment, the first signaling is transmitted in SideLink.

In one embodiment, the first signaling is transmitted via a PC5 interface.

In one embodiment, the first signaling is transmitted in DownLink.

In one embodiment, the first signaling is transmitted via Unicast.

In one embodiment, the first signaling is transmitted via Groupcast.

In one embodiment, the first signaling is transmitted via Broadcast.

In one embodiment, the first signal is a radio signal.

In one embodiment, the first signal is a baseband signal.

In one embodiment, the first signal is transmitted in SideLink.

In one embodiment, the first signal is transmitted via a PC5 interface.

In one embodiment, the first signal is transmitted via Unicast.

In one embodiment, the first signal is transmitted via Groupcast.

In one embodiment, the first signal is transmitted via Broadcast.

In one embodiment, the scheduling information comprises one or more of occupied time-domain resources, occupied frequency-domain resources, a Modulation and Coding Scheme (MCS), configuration information of DeModulation Reference Signals (DMRS), a Hybrid Automatic Repeat reQuest (HARD) process number, a Redundancy Version (RV) or a New Data Indicator (NDI).

In one embodiment, the phrase that the first signal carries a first bit block includes the meaning that: the first signal comprises an output by all or part of bits in the first bit block sequentially through Cyclic Redundancy Check (CRC) Attachment, Channel Coding, Rate Matching, a Modulation Mapper, a Layer Mapper, a transform precoder, Precoding, a Resource Element Mapper, Multicarrier Symbol Generation, and Modulation and Upconversion.

In one embodiment, the phrase that the first signal carries a first bit block includes the meaning that: the first signal comprises an output by all or part of bits in the first bit block sequentially through CRC Attachment, Channel Coding, Rate Matching, a Modulation Mapper, a Layer Mapper, Precoding, a Resource Element Mapper, Multicarrier Symbol Generation, and Modulation and Upconversion.

In one embodiment, the phrase that the first signal carries a first bit block includes the meaning that: all or part of bits in the first bit block are used for generating the first signal.

In one embodiment, the first bit block comprises a Transport Block (TB).

In one embodiment, the first bit block comprises a Code Block (CB).

In one embodiment, the first bit block comprises a Code Block Group (CBG).

In one embodiment, the number of binary bit(s) comprised in the first bit block is TBS.

In one embodiment, the first signal is an initial transmission of the first bit block.

In one embodiment, the first signal is a retransmission of the first bit block.

In one embodiment, the first value is a positive integer.

In one embodiment, the first value is measured by multicarrier symbols.

In one embodiment, the first value is measured by Physical Resource Blocks (PRB).

In one embodiment, the phrase that a first value is used for determining a number of binary bits comprised in the first bit block includes the meaning that the number of binary bit(s) comprised in the first bit block is calculated based on the hypothesis that a number of multicarrier symbols occupied by the first signal is equal to the first value.

In one embodiment, the phrase that a first value is used for determining a number of binary bits comprised in the first bit block includes the meaning that the number of binary bit(s) comprised in the first bit block is calculated based on the hypothesis that a number of PRBs occupied by the first signal is equal to the first value.

In one embodiment, the number of binary bit(s) comprised in the first bit block increases as the first value gets larger.

In one embodiment, the number of binary bit(s) comprised in the first bit block is related to a size of frequency-domain resources allocated to the first signal.

In one embodiment, the first value and the size of frequency-domain resources allocated to the first signal are jointly used for determining the number of binary bit(s) comprised in the first bit block.

In one embodiment, the number of binary bit(s) comprised in the first bit block is related to a size of time-frequency resources occupied by the first signaling.

In one embodiment, the first value, the size of frequency-domain resources allocated to the first signal and a size of time-frequency resources occupied by the first signaling are jointly used for determining the number of binary bit(s) comprised in the first bit block.

In one embodiment, the first time-frequency resource pool is used for determining the first value.

In one embodiment, the number of binary bit(s) comprised in the first bit block is unrelated to a size of time-domain resources occupied by the first signal.

In one embodiment, the number of binary bit(s) comprised in the first bit block is unrelated to a number of multicarrier symbols occupied by the first signal.

In one embodiment, the number of binary bit(s) comprised in the first bit block is unrelated to a number of multicarrier symbols available for transmitting a Physical Sidelink Shared Channel (PSSCH) comprised in slot(s) occupied by the first signal.

In one embodiment, the number of binary bit(s) comprised in the first bit block is unrelated to a size of frequency-domain resources occupied by the first signal.

In one embodiment, the number of binary bit(s) comprised in the first bit block is unrelated to a number of PRBs occupied by the first signal.

In one embodiment, the first value is related to an MCS of the first signal.

In one embodiment, an MCS of the first signal is used for determining the first value.

In one embodiment, when an MCS of the first signal belongs to a first MCS set, the first value is equal to a first integer; when an MCS of the first signal belongs to a second MCS set, the first value is equal to a second integer; the first MCS set and the second MCS set respectively comprise a positive integer number of MC S(s), none of which belonging to the first MCS set and the second MCS set simultaneously; the first integer is unequal to the second integer.

In one embodiment, the first value is related to a maximum number of retransmissions of the first bit block.

In one embodiment, a maximum number of retransmissions of the first bit block is used for determining the first value.

In one embodiment, when a maximum number of retransmissions of the first bit block is equal to S1, the first value is equal to a first integer; when a maximum number of retransmissions of the first bit block is equal to S2, the first value is equal to a second integer; S1 and S2 are positive integers, respectively, and the S1 is unequal to the S2; the first integer is unequal to the second integer.

In one embodiment, the first value is related to whether a target receiver of the first signal is required to send a HARQ-Acknowledgement (ACK) for the first bit block as feedback.

In one subembodiment of the above embodiment, the first signaling indicates whether the target receiver of the first signal is required to send a HARQ-ACK for the first bit block as feedback.

In one embodiment, when a target receiver of the first signal is required to return a HARQ-ACK for the first bit block as feedback, the first value is equal to a first integer; when a target receiver of the first signal needn't return a HARQ-ACK for the first bit block as feedback, the first value is equal to a second integer; the first integer is unequal to the second integer.

Embodiment 2

Figure 2:
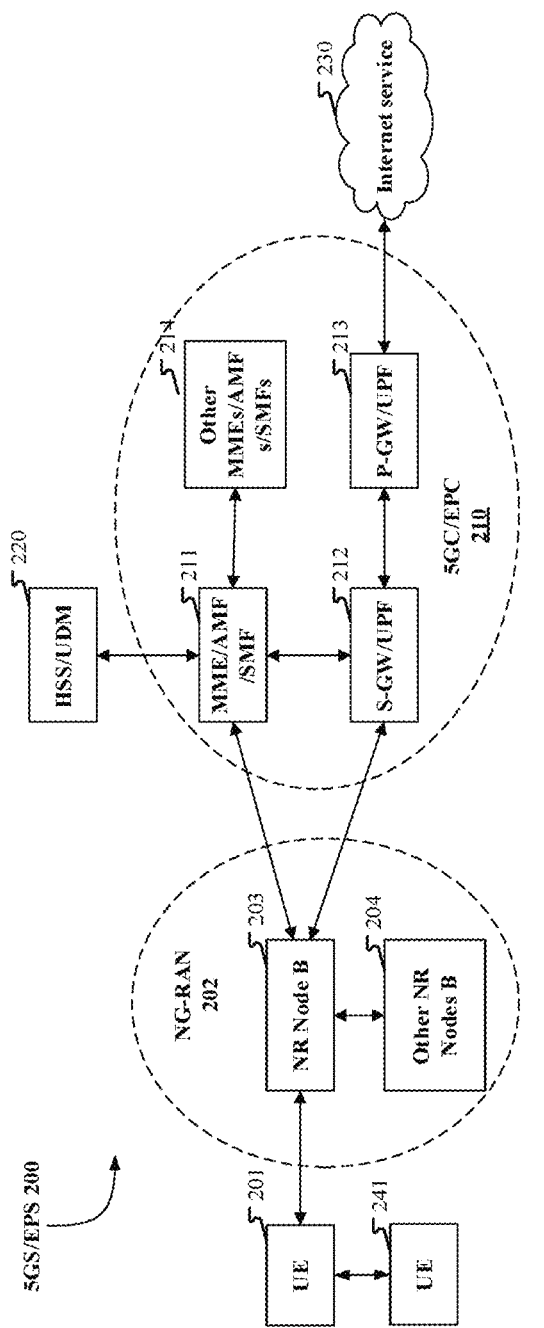
FIG. 2 illustrates a schematic diagram of network architecture according to one embodiment of the present disclosure.

Embodiment 2 illustrates a schematic diagram of a network architecture, as shown in FIG. 2.

FIG. 2 is a diagram illustrating a network architecture 200 of Long-Term Evolution (LTE), and Long-Term Evolution Advanced (LTE-A) and future 5G systems. The network architecture 200 of LTE, LTE-A or future 5G system may be called an Evolved Packet System (EPS) 200. The 5G NR or LTE network architecture may be called a 5G System (5GS)/Evolved Packet System (EPS) or some appropriate term. The 5GS/EPS 200 may comprise one or more UEs 201, a UE 241 in Sidelink communication with the UE 201(s), an NG-RAN 202, a 5G-Core Network/Evolved Packet Core (5G-CN/EPC) 210, a Home Subscriber Server (HSS) 220 and an Internet Service 230. The 5GS/EPS 200 may be interconnected with other access networks. For simple description, the entities/interfaces are not shown. As shown in FIG. 2, the 5GS/EPS 200 provides packet switching services. Those skilled in the art will find it easy to understand that various concepts presented throughout the present disclosure can be extended to networks providing circuit switching services. The NG-RAN 202 comprises an NR node B (gNB) 203 and other gNBs 204. The gNB 203 provides UE 201-oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the 5G-CN/EPC 210 for the UE 201. Examples of UE 201 include cellular phones, smart phones, Session Initiation Protocol (SIP) phones, laptop computers, Personal Digital Assistant (PDA), Satellite Radios, Global Positioning Systems (GPSs), multimedia devices, video devices, digital audio players (for example, MP3 players), cameras, games consoles, unmanned aerial vehicles, air vehicles, narrowband physical network equipment, machine-type communication equipment, land vehicles, automobiles, communication units in automobiles, wearables, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client, automobile, vehicle or some other appropriate terms. The gNB 203 is connected with the 5G-CN/EPC 210 via an S1/NG interface. The 5G-CN/EPC 210 comprises a Mobility Management Entity (MME)/Authentication Management Field (AMF)/Session Management Function (SMF) 211, other MMEs/AMFs/SMFs 214, a Service Gateway (S-GW)/User Plane Function (UPF) 212 and a Packet Date Network Gateway (P-GW)/UPF 213. The MME/AMF/SMF 211 is a control node for processing a signaling between the UE 201 and the 5G-CN/EPC 210. Generally, the MME/AMF/SMF 211 provides bearer and connection management. All user Internet Protocol (IP) packets are transmitted through the S-GW/UPF 212; the S-GW/UPF 212 is connected to the P-GW/UPF 213. The P-GW 213 provides UE IP address allocation and other functions. The P-GW/UPF 213 is connected to the Internet Service 230. The Internet Service 230 comprises operator-compatible IP services, specifically including Internet, Intranet, IP Multimedia Subsystem (IMS) and Packet Switching Services.

In one embodiment, the first node in the present disclosure comprises the UE 201.

In one embodiment, the first node in the present disclosure comprises the UE 241.

In one embodiment, the second node in the present disclosure comprises the UE 241.

In one embodiment, the second node in the present disclosure comprises the UE 201.

In one embodiment, an air interface between the UE 201 and the gNB203 is a Uu interface.

In one embodiment, a radio link between the UE 201 and the gNB203 is a cellular link.

In one embodiment, an air interface between the UE 201 and the UE 241 is a PC5 interface.

In one embodiment, a radio link between the UE 201 and the UE 241 is a Sidelink.

In one embodiment, the first node in the present disclosure is a terminal within the coverage of the gNB203, while the second node in the present disclosure is a terminal within the coverage of the gNB203.

In one embodiment, the first node in the present disclosure is a terminal within the coverage of the gNB203, while the second node in the present disclosure is a terminal out of the coverage of the gNB203.

In one embodiment, the first node in the present disclosure is a terminal out of the coverage of the gNB203, while the second node in the present disclosure is a terminal within the coverage of the gNB203.

In one embodiment, the first node in the present disclosure is a terminal out of the coverage of the gNB203, while the second node in the present disclosure is a terminal out of the coverage of the gNB203.

In one embodiment, Unicast transmission is supported between the UE 201 and the UE 241.

In one embodiment, Broadcast transmission is supported between the UE 201 and the UE 241.

In one embodiment, Groupcast transmission is supported between the UE 201 and the UE 241.

In one embodiment, a transmitter of the first signaling in the present disclosure includes the UE241.

In one embodiment, a receiver of the first signaling in the present disclosure includes the UE201.

In one embodiment, a transmitter of the first signal in the present disclosure includes the UE241.

In one embodiment, a receiver of the first signal in the present disclosure includes the UE201.

Embodiment 3

Figure 3:
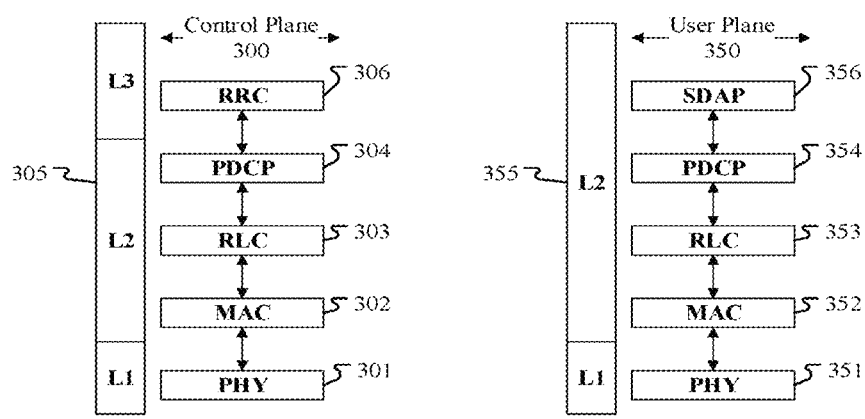
FIG. 3 illustrates a schematic diagram of a radio protocol architecture of a user plane and a control plane according to one embodiment of the present disclosure.

Embodiment 3 illustrates a schematic diagram of an embodiment of a radio protocol architecture of a user plane and a control plane according to the present disclosure, as shown in FIG. 3.

Embodiment 3 illustrates a schematic diagram illustrating a radio protocol architecture of a user plane and a control plane, as shown in FIG. 3. FIG. 3 is a schematic diagram illustrating an embodiment of a radio protocol architecture of a user plane 350 and a control plane 300. In FIG. 3, the radio protocol architecture for a control plane 300 between a first communication node (UE, gNB or, RSU in V2X) and a second communication node (gNB, UE, or RSU in V2X), or between two UEs is represented by three layers, which are a layer 1, a layer 2 and a layer 3, respectively. The layer 1 (L1) is the lowest layer which performs signal processing functions of various PHY layers. The L1 is called PHY 301 in the present disclosure. The layer 2 (L2) 305 is above the PHY 301, and is in charge of the link between the first communication node and the second communication node, and between two UEs via the PHY 301. The L2 305 comprises a Medium Access Control (MAC) sublayer 302, a Radio Link Control (RLC) sublayer 303 and a Packet Data Convergence Protocol (PDCP) sublayer 304. All the three sublayers terminate at the second communication nodes of the network side. The PDCP sublayer 304 provides multiplexing among variable radio bearers and logical channels. The PDCP sublayer 304 provides security by encrypting a packet and provides support for handover of a first communication node between second communication nodes. The RLC sublayer 303 provides segmentation and reassembling of a higher-layer packet, retransmission of a lost packet, and reordering of a packet so as to compensate the disordered receiving caused by Hybrid Automatic Repeat reQuest (HARQ). The MAC sublayer 302 provides multiplexing between a logical channel and a transport channel. The MAC sublayer 302 is also responsible for allocating between first communication nodes various radio resources (i.e., resource block) in a cell. The MAC sublayer 302 is also in charge of HARQ operation. In the control plane 300, The RRC sublayer 306 in the L3 layer is responsible for acquiring radio resources (i.e., radio bearer) and configuring the lower layer using an RRC signaling between the second communication node and the first communication node. The radio protocol architecture in the user plane 350 comprises the L1 layer and the L2 layer. In the user plane 350, the radio protocol architecture used for the first communication node and the second communication node in a PHY layer 351, a PDCP sublayer 354 of the L2 layer 355, an RLC sublayer 353 of the L2 layer 355 and a MAC sublayer 352 of the L2 layer 355 is almost the same as the radio protocol architecture used for corresponding layers and sublayers in the control plane 300, but the PDCP sublayer 354 also provides header compression used for higher-layer packet to reduce radio transmission overhead. The L2 layer 355 in the user plane 350 also comprises a Service Data Adaptation Protocol (SDAP) sublayer 356, which is in charge of the mapping between QoS streams and a Data Radio Bearer (DRB), so as to support diversified traffics. Although not described in FIG. 3, the first communication node may comprise several higher layers above the L2 305, such as a network layer (i.e., IP layer) terminated at a P-GW 213 of the network side and an application layer terminated at the other side of the connection (i.e., a peer UE, a server, etc.).

In one embodiment, the radio protocol architecture in FIG. 3 is applicable to the first node in the present disclosure.

In one embodiment, the radio protocol architecture in FIG. 3 is applicable to the second node in the present disclosure.

In one embodiment, the first signaling is generated by the PHY301 or the PHY351.

In one embodiment, the first signaling is generated by the MAC sublayer 302 or the MAC sublayer 352.

In one embodiment, the first signal is generated by the PHY301 or the PHY351.

In one embodiment, the first information block in the present disclosure is generated by the RRC sublayer 306.

In one embodiment, any signaling in the second signaling set is generated by the PHY301 or the PHY351.

In one embodiment, any signaling in the second signaling set is generated by the MAC sublayer 302 or the MAC sublayer 352.

In one embodiment, any signal in the second signal set is generated by the PHY301 or the PHY351.

Embodiment 4

Figure 4:
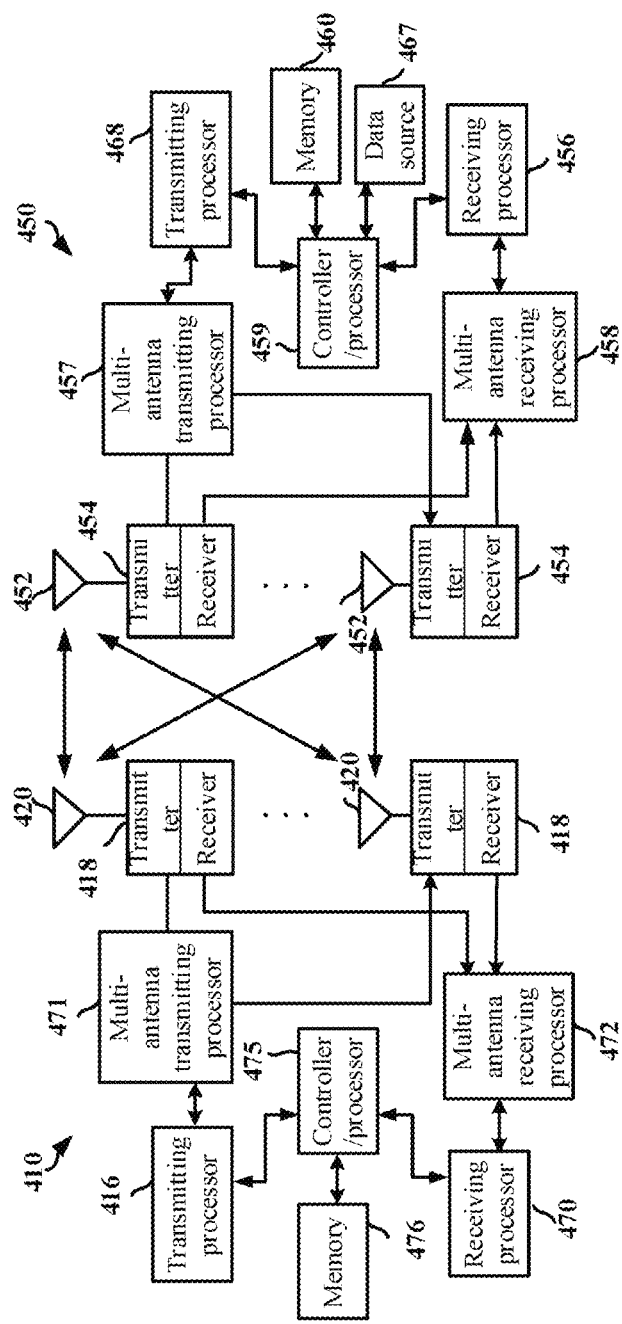
FIG. 4 illustrates a schematic diagram of a first communication device and a second communication device according to one embodiment of the present disclosure.

Embodiment 4 illustrates a schematic diagram of a first communication device and a second communication device according to the present disclosure, as shown in FIG. 4. FIG. 4 is a block diagram of a first communication device 410 and a second communication device 450 in communication with each other in an access network.

The first communication device 410 comprises a controller/processor 475, a memory 476, a receiving processor 470, a transmitting processor 416, a multi-antenna receiving processor 472, a multi-antenna transmitting processor 471, a transmitter/receiver 418 and antenna 420.

The second communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

In a transmission from the first communication device 410 to the second communication device 450, at the first communication device 410, a higher layer packet from a core network is provided to the controller/processor 475. The controller/processor 475 implements the functionality of the L2 layer. In downlink (DL) transmission, the controller/processor 475 provides header compression, encryption, packet segmentation and reordering, and multiplexing between a logical channel and a transport channel, and radio resource allocation of the second communication device 450 based on various priorities. The controller/processor 475 is also in charge of HARQ operation, a retransmission of a lost packet and a signaling to the second communication device 450. The transmitting processor 416 and the multi-antenna transmitting processor 471 perform various signal processing functions used for the L1 layer (i.e., PHY). The transmitting processor 416 performs coding and interleaving so as to ensure a Forward Error Correction (FEC) at the second communication device 450 side and constellation mapping corresponding to each modulation scheme (i.e., BPSK, QPSK, M-PSK, and M-QAM, etc.). The multi-antenna transmitting processor 471 performs digital spatial precoding, which includes precoding based on codebook and precoding based on non-codebook, and beamforming processing on encoded and modulated signals to generate one or more parallel streams. The transmitting processor 416 then maps each parallel stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams. After that the multi-antenna transmitting processor 471 performs transmission analog precoding/beamforming on the time-domain multicarrier symbol streams. Each transmitter 418 converts a baseband multicarrier symbol stream provided by the multi-antenna transmitting processor 471 into a radio frequency (RF) stream, which is later provided to different antennas 420.

In a transmission from the first communication device 410 to the second communication device 450, at the second communication device 450, each receiver 454 receives a signal via a corresponding antenna 452. Each receiver 454 recovers information modulated to the RF carrier, and converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs reception analog precoding/beamforming on a baseband multicarrier symbol stream provided by the receiver 454. The receiving processor 456 converts the processed baseband multicarrier symbol stream from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any second communication device 450-targeted parallel stream. Symbols on each parallel stream are demodulated and recovered in the receiving processor 456 to generate a soft decision. Then the receiving processor 456 decodes and de-interleaves the soft decision to recover the higher-layer data and control signal transmitted by the first communication device 410 on the physical channel. Next, the higher-layer data and control signal are provided to the controller/processor 459. The controller/processor 459 performs functions of the L2 layer. The controller/processor 459 can be associated with a memory 460 that stores program code and data. The memory 460 can be called a computer readable medium. In DL transmission, the controller/processor 459 provides demultiplexing between a transport channel and a logical channel, packet reassembling, decrypting, header decompression and control signal processing so as to recover a higher-layer packet from the core network. The higher-layer packet is later provided to all protocol layers above the L2 layer, or various control signals can be provided to the L3 layer for processing. The controller/processor 459 is also in charge of performing error detection using ACK and/or NACK protocols to support HARQ operation.

In a transmission from the second communication device 450 to the first communication device 410, at the second communication device 450, the data source 467 is configured to provide a higher-layer packet to the controller/processor 459. The data source 467 represents all protocol layers above the L2 layer. Similar to a transmitting function of the first communication device 410 described in the DL transmission, the controller/processor 459 performs header compression, encryption, packet segmentation and reordering, and multiplexing between a logical channel and a transport channel based on radio resource allocation of the first communication device 410 so as to provide the L2 layer functions used for the user plane and the control plane. The controller/processor 459 is also responsible for HARQ operation, a retransmission of a lost packet, and a signaling to the first communication device 410. The transmitting processor 468 performs modulation and mapping, as well as channel coding, and the multi-antenna transmitting processor 457 performs digital multi-antenna spatial precoding, including precoding based on codebook and precoding based on non-codebook, and beamforming. The transmitting processor 468 then modulates generated parallel streams into multicarrier/single-carrier symbol streams. The modulated symbol streams, after being subjected to analog precoding/beamforming in the multi-antenna transmitting processor 457, are provided from the transmitter 454 to each antenna 452. Each transmitter 454 first converts a baseband symbol stream provided by the multi-antenna transmitting processor 457 into a radio frequency symbol stream, and then provides the radio frequency symbol stream to the antenna 452.

In a transmission from the second communication device 450 to the first communication device 410, the function of the first communication device 410 is similar to the receiving function of the second communication device 450 described in the transmission from the first communication device 410 to the second communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and the multi-antenna receiving processor 472 jointly provide functions of the L1 layer. The controller/processor 475 provides functions of the L2 layer. The controller/processor 475 can be associated with the memory 476 that stores program code and data. The memory 476 can be called a computer readable medium. The controller/processor 475 provides de-multiplexing between a transport channel and a logical channel, packet reassembling, decrypting, header decompression, control signal processing so as to recover a higher-layer packet from the second communication device 450. The higher-layer packet coming from the controller/processor 475 may be provided to the core network. The controller/processor 475 is also in charge of performing error detection using ACK and/or NACK protocols to support HARQ operation.

In one embodiment, the second communication device 450 comprises at least one processor and at least one memory, the at least one memory comprises computer program codes; the at least one memory and the computer program codes are configured to be used in collaboration with the at least one processor, the second communication device 450 at least receives the first signaling of the present disclosure in the first time-frequency resource pool of the present disclosure; and receives the first signal of the present disclosure in the first time-frequency resource pool. The first signaling comprises scheduling information of the first signal; the first signal carries a first bit block, the first bit block comprising a positive integer number of binary bits; a first value is used for determining a number of binary bits comprised in the first bit block, and the first value is related to the first time-frequency resource pool.

In one embodiment, the second communication device 450 comprises a memory that stores computer readable instruction program, the computer readable instruction program generates actions when executed by at least one processor, which include: receiving the first signaling of the present disclosure in the first time-frequency resource pool of the present disclosure; and receiving the first signal of the present disclosure in the first time-frequency resource pool. The first signaling comprises scheduling information of the first signal; the first signal carries a first bit block, the first bit block comprising a positive integer number of binary bits; a first value is used for determining a number of binary bits comprised in the first bit block, and the first value is related to the first time-frequency resource pool.

In one embodiment, the first communication device 410 comprises at least one processor and at least one memory, the at least one memory comprises computer program codes; the at least one memory and the computer program codes are configured to be used in collaboration with the at least one processor. The first communication device 410 at least transmits the first signaling of the present disclosure in the first time-frequency resource pool of the present disclosure; and transmits the first signal of the present disclosure in the first time-frequency resource pool. The first signaling comprises scheduling information of the first signal; the first signal carries a first bit block, the first bit block comprising a positive integer number of binary bits; a first value is used for determining a number of binary bits comprised in the first bit block, and the first value is related to the first time-frequency resource pool.

In one embodiment, the first communication device 410 comprises a memory that stores computer readable instruction program, the computer readable instruction program generates actions when executed by at least one processor, which include: transmitting the first signaling of the present disclosure in the first time-frequency resource pool of the present disclosure; and transmitting the first signal of the present disclosure in the first time-frequency resource pool. The first signaling comprises scheduling information of the first signal; the first signal carries a first bit block, the first bit block comprising a positive integer number of binary bits; a first value is used for determining a number of binary bits comprised in the first bit block, and the first value is related to the first time-frequency resource pool.

In one embodiment, the first node in the present disclosure comprises the second communication device 450.

In one embodiment, the second node in the present disclosure comprises the first communication device 410.

In one embodiment, at least one of the antenna 452, the receiver 454, the receiving processor 456, the multi-antenna receiving processor 458, the controller/processor 459, the memory 460 or the data source 467 is used for receiving the first signaling of the present disclosure in the first time-frequency resource pool of the present disclosure; at least one of the antenna 420, the transmitter 418, the transmitting processor 416, the multi-antenna transmitting processor 471, the controller/processor 475 or the memory 476 is used for transmitting the first signaling of the present disclosure in the first time-frequency resource pool of the present disclosure.

In one embodiment, at least one of the antenna 452, the receiver 454, the receiving processor 456, the multi-antenna receiving processor 458, the controller/processor 459, the memory 460 or the data source 467 is used for receiving the first signal of the present disclosure in the first time-frequency resource pool of the present disclosure; at least one of the antenna 420, the transmitter 418, the transmitting processor 416, the multi-antenna transmitting processor 471, the controller/processor 475 or the memory 476 is used for transmitting the first signal of the present disclosure in the first time-frequency resource pool of the present disclosure.

In one embodiment, at least one of the antenna 452, the receiver 454, the receiving processor 456, the multi-antenna receiving processor 458, the controller/processor 459, the memory 460 or the data source 467 is used for receiving the first information block in the present disclosure; at least one of the antenna 420, the transmitter 418, the transmitting processor 416, the multi-antenna transmitting processor 471, the controller/processor 475 or the memory 476 is used for transmitting the first information block in the present disclosure.

In one embodiment, at least one of the antenna 452, the receiver 454, the receiving processor 456, the multi-antenna receiving processor 458, the controller/processor 459, the memory 460 or the data source 467 is used for receiving the second signaling set and the second signal set in the present disclosure; at least one of the antenna 420, the transmitter 418, the transmitting processor 416, the multi-antenna transmitting processor 471, the controller/processor 475 or the memory 476 is used for transmitting the second signaling set and the second signal set in the present disclosure.

Embodiment 5

Figure 5:
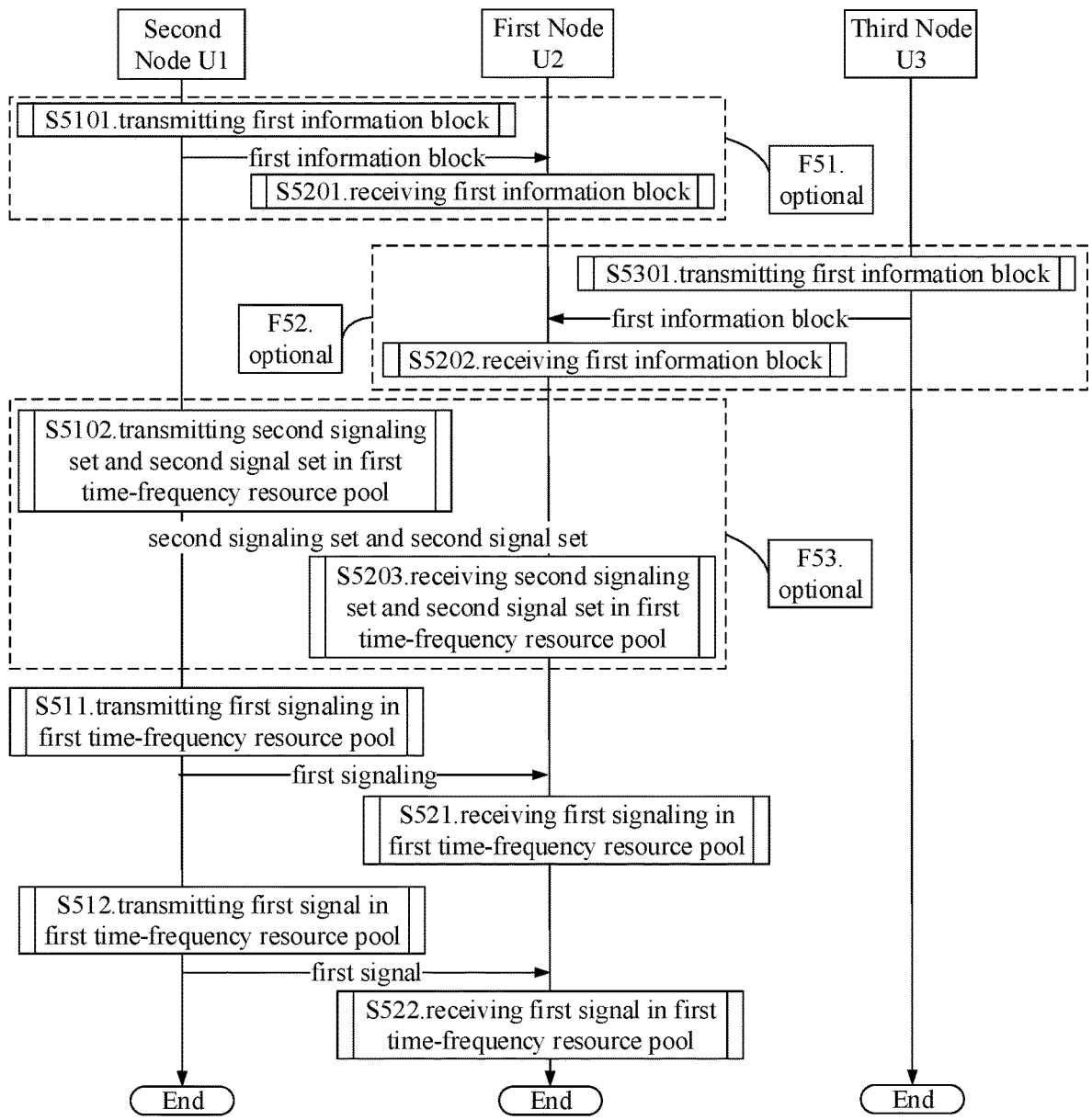
FIG. 5 illustrates a flowchart of wireless transmission according to one embodiment of the present disclosure.

Embodiment 5 illustrates a flowchart of wireless transmission according to one embodiment of the present disclosure, as shown in FIG. 5. In FIG. 5, a second node U1, a first node U2 and a third node U3 are communication nodes that communicate with one another via an air interface. In FIG. 5, steps marked by box F51 to box F53 are optional, respectively. And steps illustrated in box F51 cannot coexist with steps in box F52.

The second node U1 transmits a first information block in step S5101; transmits a second signaling set and a second signal set in a first time-frequency resource pool in step S5102; transmits a first signaling in the first time-frequency resource pool in step S511; and transmits a first signal in the first time-frequency resource pool in step S512.

The first node U2 receives a first information block in step S5201; receives a first information block in step S5202; receives a second signaling set and a second signal set in a first time-frequency resource pool in step S5203; receives a first signaling in the first time-frequency resource pool in step S521; and receives a first signal in the first time-frequency resource pool in step S522.

The third node U3 transmits a first information block in step S5301.

In Embodiment 5, the first signaling comprises scheduling information of the first signal; the first signal carries a first bit block, the first bit block comprising a positive integer number of binary bits; a first value is used for determining a number of binary bits comprised in the first bit block, and the first value is related to the first time-frequency resource pool. The first information block indicates the first time-frequency resource pool.

In one embodiment, the first node U2 is the first node in the present disclosure.

In one embodiment, the second node U1 is the second node in the present disclosure.

In one embodiment, the third node U3 is a base station.

In one embodiment, an interface between the second node U1 and the first node U2 is a PC5 interface.

In one embodiment, an interface between the second node U1 and the first node U2 comprises Sidelink.

In one embodiment, an interface between the second node U1 and the first node U2 comprises a wireless interface between UEs.

In one embodiment, an interface between the second node U1 and the first node U2 comprises a wireless interface between a UE and a relay node.

In one embodiment, an air interface between the third node U3 and the first node U2 is a Uu interface.

In one embodiment, an air interface between the third node U3 and the first node U2 comprises a cellular link.

In one embodiment, an air interface between the third node U3 and the first node U2 comprises a wireless interface between a base station and a UE.

In one embodiment, the first node in the present disclosure is a terminal.

In one embodiment, the first node in the present disclosure is a car.

In one embodiment, the first node in the present disclosure is a vehicle.

In one embodiment, the first node in the present disclosure is a Road Side Unit (RSU).

In one embodiment, the second node in the present disclosure is a terminal.

In one embodiment, the second node in the present disclosure is a car.

In one embodiment, the second node in the present disclosure is a vehicle.

In one embodiment, the second node in the present disclosure is an RSU.

In one embodiment, the first value is used by the first node in the present disclosure for determining the number of binary bit(s) comprised in the first bit block.

In one embodiment, the first value is used by the second node in the present disclosure for determining the number of binary bit(s) comprised in the first bit block.

In one embodiment, a cast type of the first signal is used by the first node for determining the first value.

In one embodiment, a cast type of the first signal is used by the second node for determining the first value.

In one embodiment, a priority of the first signal is used by the first node for determining the first value.

In one embodiment, a priority of the first signal is used by the second node for determining the first value.

In one embodiment, the first value and a number of frequency-domain resource blocks allocated to the first signal are jointly used by the first node for determining a first-type value, wherein the first-type value is used by the first node for determining a second-type value, and the second-type value is used by the first node for determining the number of the binary bits comprised in the first bit block.

In one embodiment, the first value and a number of frequency-domain resource blocks allocated to the first signal are jointly used by the second node for determining a first-type value, wherein the first-type value is used by the second node for determining a second-type value, and the second-type value is used by the second node for determining the number of the binary bits comprised in the first bit block.

In one embodiment, the first signaling is transmitted on a sidelink physical layer control channel (i.e., a sidelink channel only capable of carrying a physical layer signaling).

In one embodiment, the first signaling is transmitted on a Physical Sidelink Control Channel (PSCCH).

In one embodiment, the first signal is transmitted on a sidelink physical layer data channel (i.e., a sidelink channel capable of carrying physical layer data).

In one embodiment, the first signal is transmitted on a PSSCH.

In one embodiment, steps marked by the box F51 in FIG. 5 exist, while steps marked by the box F52 do not exist.

In one embodiment, steps marked by the box F52 in FIG. 5 exist, while steps marked by the box F51 do not exist.

In one embodiment, the first information block is transmitted on a PSSCH.

In one embodiment, the first information block is transmitted on a Physical Downlink Shared CHannel (PDSCH).

In one embodiment, the first information block is transmitted on a Physical Sidelink Broadcast Channel (PSBCH).

In one embodiment, the first information block is transmitted on a Physical Broadcast Channel (PBCH).

In one embodiment, steps marked by the box F53 in FIG. 5 exist, the second signaling set comprises a positive integer number of signaling(s), and the second signal set comprises a positive integer number of signal(s); each signaling in the second signaling set comprises scheduling information of a signal in the second signal set, while each signal in the second signal set carries the first bit block.

In one embodiment, any signaling in the second signaling set is transmitted on a sidelink physical layer control channel (i.e., a sidelink channel only capable of carrying a physical layer signaling).

In one embodiment, any signaling in the second signaling set is transmitted on a PSCCH.

In one embodiment, any signal in the second signal set is transmitted on a sidelink physical layer data channel (i.e., a sidelink channel capable of carrying physical layer data).

In one embodiment, any signal in the second signal set is transmitted on a PSSCH.

In one embodiment, steps marked by the box F53 in FIG. 5 do not exist.

Embodiment 6

Figure 6:
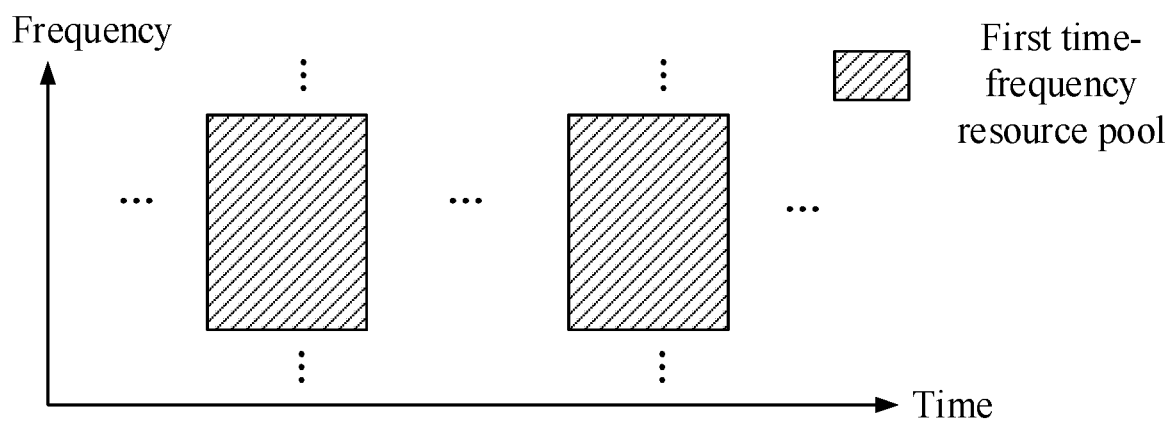
FIG. 6 illustrates a schematic diagram of a first time-frequency resource pool according to one embodiment of the present disclosure.

Embodiment 6 illustrates a schematic diagram of a first time-frequency resource pool according to one embodiment of the present disclosure; as shown in FIG. 6. In Embodiment 6, the first time-frequency resource pool comprises a positive integer number of Resource Element(s) (RE).

In one embodiment, a RE occupies a multicarrier symbol in time domain and a subcarrier in frequency domain.

In one embodiment, the multicarrier symbol is an Orthogonal Frequency Division Multiplexing (OFDM) symbol.

In one embodiment, the multicarrier symbol is a Single Carrier-Frequency Division Multiple Access (SC-FDMA) symbol.

In one embodiment, the multicarrier symbol is a Discrete Fourier Transform Spread OFDM (DFT-S-OFDM) symbol.

In one embodiment, the first time-frequency resource pool comprises a positive integer number of subcarrier(s) in frequency domain.

In one embodiment, the first time-frequency resource pool comprises a positive integer number of PRB(s) in frequency domain.

In one embodiment, the first time-frequency resource pool comprises a positive integer number of consecutive PRBs in frequency domain.

In one embodiment, the first time-frequency resource pool comprises a positive integer number of non-consecutive PRBs in frequency domain.

In one embodiment, the first time-frequency resource pool comprises a positive integer number of sub-channel(s) in frequency domain.

In one embodiment, the sub-channel comprises a positive integer number of subcarrier(s).

In one embodiment, the sub-channel comprises a positive integer number of consecutive subcarriers.

In one embodiment, the sub-channel comprises a positive integer number of PRB(s).

In one embodiment, the sub-channel comprises a positive integer number of consecutive PRBs.

In one embodiment, the first time-frequency resource pool comprises a positive integer number of multicarrier symbol(s) in time domain.

In one embodiment, the first time-frequency resource pool comprises a positive integer number of consecutive multicarrier symbols in time domain.

In one embodiment, the first time-frequency resource pool comprises a positive integer number of slot(s) in time domain.

In one embodiment, the first time-frequency resource pool comprises a positive integer number of consecutive slots in time domain.

In one embodiment, the first time-frequency resource pool comprises a positive integer number of non-consecutive slots in time domain.

In one embodiment, the first time-frequency resource pool comprises a positive integer number of sub-frame(s) in time domain.

In one embodiment, the first time-frequency resource pool occurs multiple times in time domain.

In one embodiment, time-frequency resources in the first time-frequency resource pool are reserved for V2X transmission.

In one embodiment, time-frequency resources in the first time-frequency resource pool are reserved for sidelink.

Embodiment 7

Figure 7:
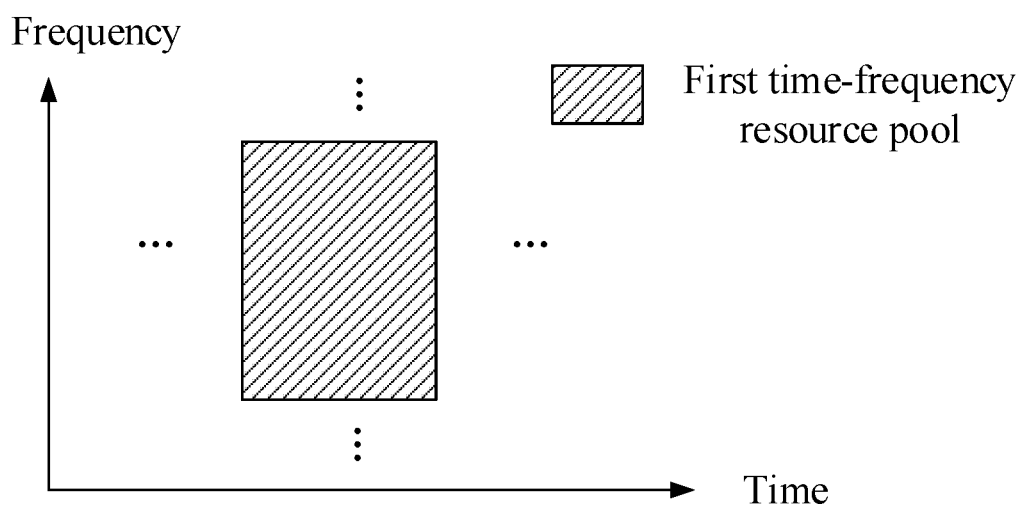
FIG. 7 illustrates a schematic diagram of a first time-frequency resource pool according to one embodiment of the present disclosure.

Embodiment 7 illustrates a schematic diagram of a first time-frequency resource pool according to one embodiment of the present disclosure; as shown in FIG. 7. In Embodiment 7, the first time-frequency resource pool occurs only once in time domain.

Embodiment 8

Figure 8:
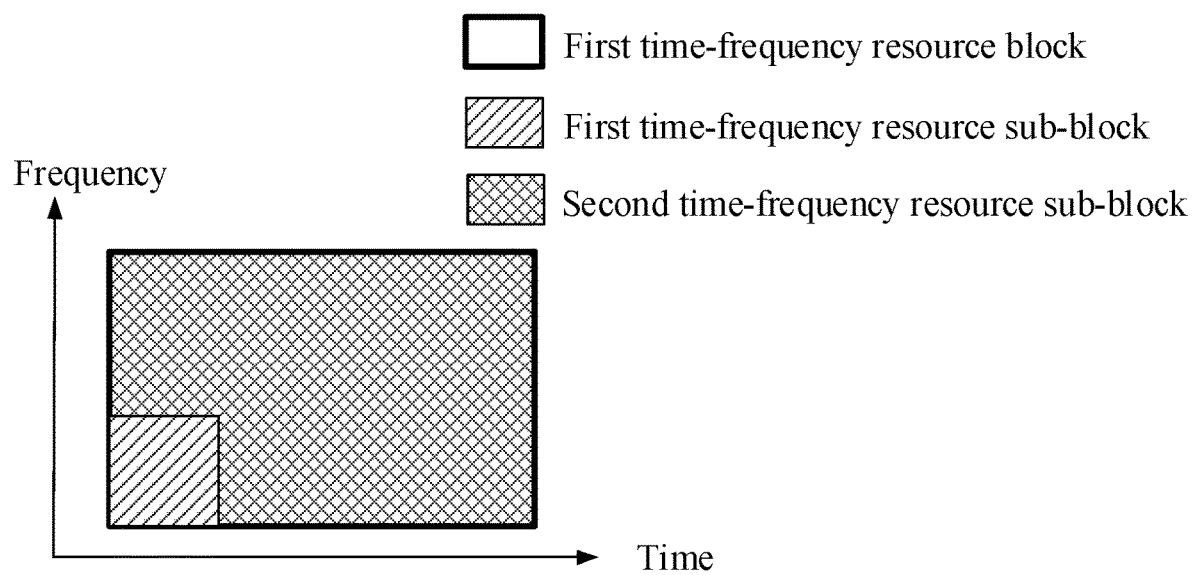
FIG. 8 illustrates a schematic diagram of resources mapping of a first signaling and a first signal according to one embodiment of the present disclosure.

Embodiment 8 illustrates a schematic diagram of resources mapping of a first signaling and a first signal according to one embodiment of the present disclosure; as shown in FIG. 8. In Embodiment 8, the first signaling is transmitted in a first time-frequency resource sub-block comprised by the first time-frequency resource pool, while the first signal is transmitted in a second time-frequency resource sub-block comprised by the first time-frequency resource pool; the first time-frequency resource sub-block and the second time-frequency resource sub-block constitute a first time-frequency resource block, and the first time-frequency resource sub-block is orthogonal with the second time-frequency resource sub-block.

In one embodiment, time-frequency resources respectively occupied by the first signal and the first signaling are mutually orthogonal.

In one embodiment, the first signaling and the first signal belong to a same slot in time domain.

In one embodiment, the first signaling and the first signal belong to a same sub-frame in time domain.

In one embodiment, the first time-frequency resource block comprises a positive integer number of consecutive multicarrier symbols in time domain, and a positive integer number of consecutive PRBs in frequency domain.

In one embodiment, the first time-frequency resource sub-block comprises a positive integer number of RE(s).

In one embodiment, the second time-frequency resource sub-block comprises a positive integer number of RE(s).

In one embodiment, the first time-frequency resource sub-block occupies part of time-domain resources comprised in the first time-frequency resource block in time domain.

In one embodiment, the first time-frequency resource sub-block occupies earliest positive integer number of multicarrier symbol(s) in the first time-frequency resource block in time domain.

In one embodiment, the first time-frequency resource sub-block occupies part of frequency-domain resources in the first time-frequency resource block in frequency domain.

In one embodiment, the first time-frequency resource sub-block occupies lowest positive integer number of sub-channel(s) in the first time-frequency resource block in frequency domain.

Embodiment 9

Figure 9:
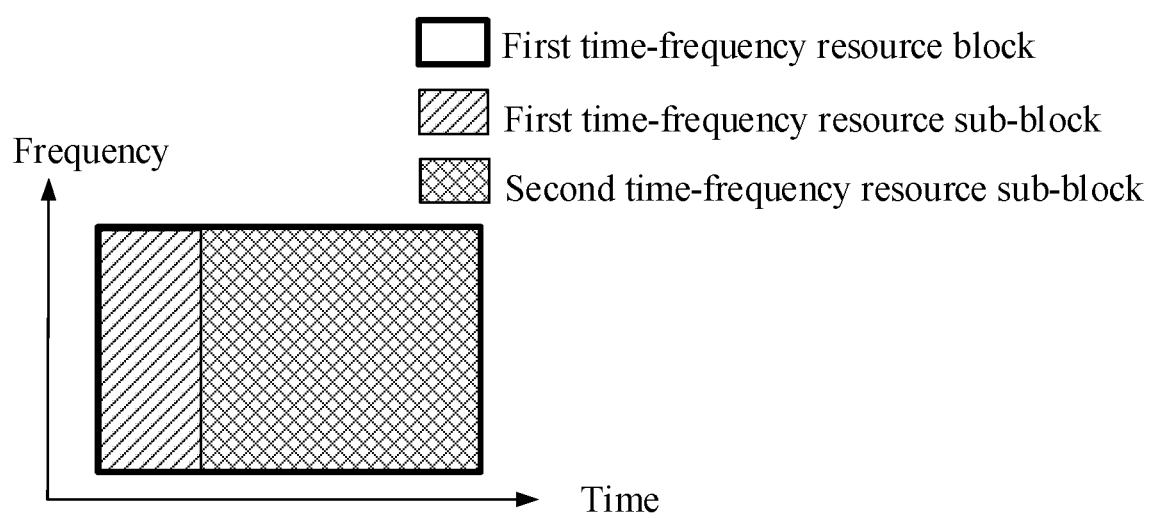
FIG. 9 illustrates a schematic diagram of resources mapping of a first signaling and a first signal according to one embodiment of the present disclosure.

Embodiment 9 illustrates a schematic diagram of resources mapping of a first signaling and a first signal according to one embodiment of the present disclosure; as shown in FIG. 9. In Embodiment 9, the first time-frequency resource sub-block in Embodiment 8 occupies all frequency-domain resources in the first time-frequency resource block in Embodiment 8.

Embodiment 10

Figure 10:
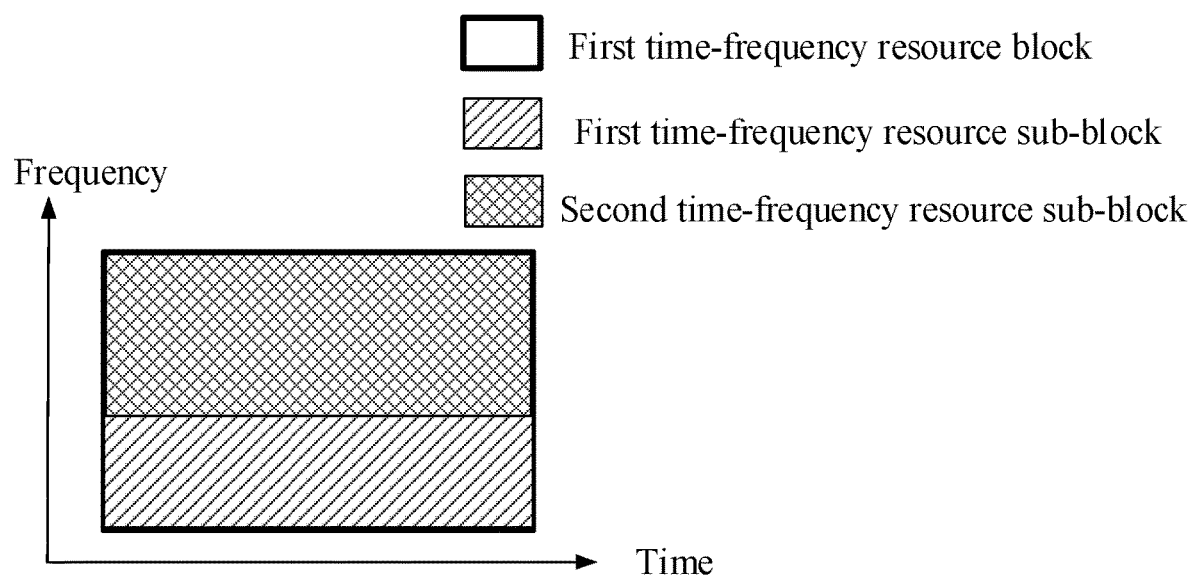
FIG. 10 illustrates a schematic diagram of resources mapping of a first signaling and a first signal according to one embodiment of the present disclosure.

Embodiment 10 illustrates a schematic diagram of resources mapping of a first signaling and a first signal according to one embodiment of the present disclosure; as shown in FIG. 10. In Embodiment 10, the first time-frequency resource sub-block in Embodiment 8 occupies all time-domain resources in the first time-frequency resource block in Embodiment 8.

Embodiment 11

Figure 11:
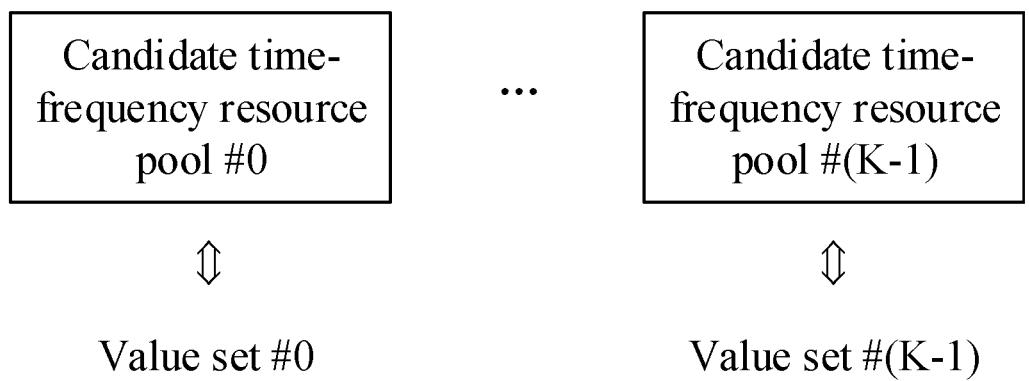
FIG. 11 illustrates a schematic diagram of K candidate time-frequency resource pools and K value sets according to one embodiment of the present disclosure.

Embodiment 11 illustrates a schematic diagram of K candidate time-frequency resource pools and K value sets according to one embodiment of the present disclosure; as shown in FIG. 11. In Embodiment 11, the K value sets respectively correspond to the K candidate time-frequency resource pools; the first time-frequency resource pool is a candidate time-frequency resource pool of the K candidate time-frequency resource pools; the first value set is one of the K value sets that corresponds to the first time-frequency resource pool, and the first value is a value in the first value set. In FIG. 11, indexes of the K value sets and the K candidate time-frequency resource pools are #0, . . . and #(K−1), respectively.

In one embodiment, any of the K candidate time-frequency resource pools comprises a positive integer number of RE(s).

In one embodiment, any of the K candidate time-frequency resource pools comprises a positive integer number of sub-channel(s) in frequency domain.

In one embodiment, any of the K candidate time-frequency resource pools comprises a positive integer number of slot(s) in time domain.

In one embodiment, any of the K candidate time-frequency resource pools is reserved for V2X transmissions.

In one embodiment, any of the K candidate time-frequency resource pools is reserved for sidelink.

In one embodiment, the K candidate time-frequency resource pools belong to a same serving cell.

In one embodiment, the K candidate time-frequency resource pools belong to a same carrier in frequency domain.

In one embodiment, the K candidate time-frequency resource pools belong to a same Bandwidth Part (BWP) in frequency domain.

In one embodiment, the K candidate time-frequency resource pools belong to a same SideLink (SL) BWP.

In one embodiment, the K candidate time-frequency resource pools are configured by a higher layer signaling.

In one embodiment, the K candidate time-frequency resource pools are configured by an RRC signaling.

In one embodiment, the K value sets are configured by a higher layer signaling.

In one embodiment, the K value sets are configured by an RRC signaling.

In one embodiment, a correspondence relation between the K candidate time-frequency resource pools and the K value sets is configured by a higher layer signaling.

In one embodiment, a correspondence relation between the K candidate time-frequency resource pools and the K value sets is configured by an RRC signaling.

In one embodiment, any value comprised in the K value sets is a positive integer.

In one embodiment, any value comprised in the K value sets is measured by multicarrier symbols.

In one embodiment, any value comprised in the K value sets is measured by PRBs.

In one embodiment, any of the K value sets comprises multiple values.

In one embodiment, any of the K value sets comprises only one value.

In one embodiment, among the K value sets there is one value set comprising multiple values.

In one embodiment, among the K value sets there is one value set comprising just one value.

In one embodiment, when one of the K value sets comprises multiple values, the multiple values are different from one another.

In one embodiment, the first value set comprises at least one value other than the first value.

In one embodiment, the first value set comprises only the first value.

In one embodiment, the first value set comprises multiple values, and the first signaling indicates the first value from the first value set.

In one embodiment, the first value set comprises multiple values, and the first signaling explicitly indicates the first value from the first value set.

In one embodiment, the first value set comprises multiple values, and the first signaling implicitly indicates the first value from the first value set.

In one embodiment, the first value set comprises multiple values, and an MCS of the first signal is used for determining the first value out of the first value set.

In one embodiment, the first value set comprises multiple values, and a maximum number of retransmissions of the first bit block is used for determining the first value out of the first value set.

In one embodiment, the first value set comprises multiple values, and whether a target receiver of the first signal is required to return a HARQ-ACK for the first bit block as feedback is used for determining the first value out of the first value set.

Embodiment 12

Embodiment 12 illustrates a schematic diagram of a cast type of a first signal being used for determining a first value according to one embodiment of the present disclosure; as show in FIG. 12.

In one embodiment, the cast type of the first signal is one of Unicast, Groupcast or Broadcast.

In one embodiment, the first signaling indicates the cast type of the first signal.

In one embodiment, the first signaling explicitly indicates the cast type of the first signal.

In one embodiment, the first signaling implicitly indicates the cast type of the first signal.

In one embodiment, the cast type of the first signal is used for determining the first value out of the first value set.

In one embodiment, when the cast type of the first signal is Unicast, the first value is equal to a first integer; when the cast type of the first signal is Groupcast, the first value is equal to a second integer; when the cast type of the first signal is Broadcast, the first value is equal to a third integer; two integers among the first integer, the second integer and the third integer are unequal.

In one subembodiment of the above embodiment, the first integer, the second integer and the third integer are mutually unequal.

In one subembodiment of the above embodiment, two integers among the first integer, the second integer and the third integer are equal.

In one embodiment, the first value set comprises K1 values, K1 being a positive integer greater than 1; the K1 values respectively correspond to K1 cast type sets, and any of the K1 cast type sets comprises a positive integer number of cast type(s); the cast type of the first signal belongs to a first cast type set among the K1 cast type sets, the first value being one of the K1 values that corresponds to the first cast type set.

In one subembodiment of the above embodiment, the K1 values are mutually unequal.

In one subembodiment of the above embodiment, any cast type comprised in the K1 cast type sets is one of Unicast, Groupcast or Broadcast.

In one subembodiment of the above embodiment, there isn't any cast type belonging to two cast type sets among the K1 cast type sets simultaneously.

In one subembodiment of the above embodiment, the K1 cast type sets are configured by a higher layer signaling.

In one subembodiment of the above embodiment, a correspondence relation between the K1 cast type sets and the K1 values is configured by a higher layer signaling.

Embodiment 13

Embodiment 13 illustrates a schematic diagram of a priority of a first signal being used for determining a first value according to one embodiment of the present disclosure; as shown in FIG. 13.

In one embodiment, the priority of the first signal is a priority of Q priorities, Q being a positive integer greater than 1.

In one subembodiment, each V2X message corresponds to one of the Q priorities.

In one subembodiment, any of the Q priorities implicitly indicates one or more of delay request, traffic type, reliability request or a maximum communication distance of a corresponding V2X message.

In one subembodiment, any of the Q priorities comprises one or more of a Proximity Services (ProSe) Per-Packet Priority/Per-Packet Priority (PPPP), a ProSe Per-Packet Reliability (PPPR), a 5G QoS Indicator (5QI or a PC5 QoS Indicator (PQI).

In one embodiment, the priority of the first signal indicates one or more of a delay request, a traffic type, a reliability request or a maximum communication distance of a V2X message corresponding to the first signal.

In one embodiment, the priority of the first signal implicitly indicates one or more of a delay request, a traffic type, a reliability request or a maximum communication distance of a V2X message corresponding to the first signal.

In one embodiment, the priority of the first signal is conveyed from a higher layer of the first node to a Medium Access Control (MAC) layer of the first node.

In one embodiment, the priority of the first signal is conveyed from a higher layer of the first node to a Physical (PHY) layer of the first node.

In one embodiment, the priority of the first signal comprises a PPPP.

In one embodiment, the priority of the first signal comprises a PPPR.

In one embodiment, the priority of the first signal comprises a 5QI.

In one embodiment, the priority of the first signal comprises a PQI.

In one embodiment, the priority of the first signal is a non-negative integer.

In one embodiment, the priority of the first signal is a positive integer.

In one embodiment, the priority of the first signal is used for V2X communications on a PC5 interface.

In one embodiment, the priority of the first signal comprises Quality of Service (QoS) of the first signal.

In one embodiment, the priority of the first signal comprises QoS of the first signal used for V2X communications on a PC5 interface.

In one embodiment, for the definition of the priority of the first signal, refer to 3GPP TS23.285, section 4.4.5.1.

In one embodiment, the first signaling indicates the priority of the first signal.

In one embodiment, the first signaling explicitly indicates the priority of the first signal.

In one embodiment, the first signaling implicitly indicates the priority of the first signal.

In one embodiment, the priority of the first signal is used for determining the first value out of the first value set.

In one embodiment, when the priority of the first signal is a priority class in a first priority class set, the first value is a fourth integer; when the priority of the first signal is a priority class in a second priority class set, the first value is a fifth integer; the first priority class set and the second priority class set respectively comprise a positive integer number of priority class(es), there is no priority class belonging to both the first priority class set and the second priority class set; the fourth integer is unequal to the fifth integer.

In one embodiment, the first value set comprises K1 values, K1 being a positive integer greater than 1; the K1 values respectively correspond to K1 priority class sets, and any of the K1 priority class sets comprises a positive integer number of priority class(es), none of the priority class(es) belonging to two priority class sets among the K1 priority class sets at the same time; the priority of the first signal belongs to a first priority class set of the K1 priority class sets, the first value being one of the K1 values that corresponds to the first priority class set.

In one subembodiment of the above embodiment, the K1 priority class sets are configured by a higher layer signaling.

In one subembodiment of the above embodiment, a correspondence relation between the K1 priority class sets and the K1 values is configured by a higher layer signaling.

Embodiment 14

Figure 14:
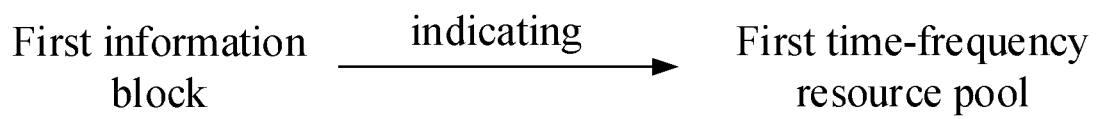
FIG. 14 illustrates a schematic diagram of a first information block according to one embodiment of the present disclosure.

Embodiment 14 illustrates a schematic diagram of a first information block according to one embodiment of the present disclosure; as shown in FIG. 14. In Embodiment 14, the first information block indicates the first time-frequency resource pool.

In one embodiment, the first information block is carried by a higher layer signaling.

In one embodiment, the first information block is carried by an RRC signaling.

In one embodiment, the first information block is carried by a Medium Access Control layer Control Element (MAC CE) signaling.

In one embodiment, the first information block is transmitted in Sidelink.

In one embodiment, the first information block is transmitted via a PC5 interface.

In one embodiment, the first information block is transmitted in downlink.

In one embodiment, the first information block is transmitted via a Uu interface.

In one embodiment, the first information block comprises information of all or part of fields in an Information Element (IE).

In one embodiment, the first information block comprises information of one or more fields in a Master Information Block (MIB).

In one embodiment, the first information block comprises information of one or more fields in a System Information Block (SIB).

In one embodiment, the first information block comprises information of one or more fields in Remaining System Information (RMSI).

In one embodiment, the first information block is transmitted via a radio signal.

In one embodiment, the first information block is transmitted from a transmitter of the first signal to the first node.

In one embodiment, the first information block is transmitted from a serving cell of the first node to the first node.

In one embodiment, the first information block is transferred from an upper layer of the first node to a physical layer of the first node.

In one embodiment, the first information block is transferred from a higher layer of the first node to a physical layer of the first node.

In one embodiment, the first information block is transferred from an upper layer of the second node to a physical layer of the second node.

In one embodiment, the first information block is transferred from a higher layer of the second node to a physical layer of the second node.

In one embodiment, the first information block indicates that the first time-frequency resource pool is reserved for V2X transmissions.

In one embodiment, the first information block indicates that the first time-frequency resource pool is reserved for sidelink.

In one embodiment, the first information block indicates the first value.

In one embodiment, the first information block indicates that the first value corresponds to the first time-frequency resource pool.

In one embodiment, the first information block indicates the K candidate time-frequency resource pools.

In one embodiment, the first information block indicates that the K candidate time-frequency resource pools are respectively reserved for V2X transmissions.

In one embodiment, the first information block indicates that the K candidate time-frequency resource pools are respectively reserved for sidelink.

In one embodiment, the first information block indicates the K value sets.

In one embodiment, the first information block indicates a correspondence relation between the K candidate time-frequency resource pools and the K value sets.

Embodiment 15

Figure 15:
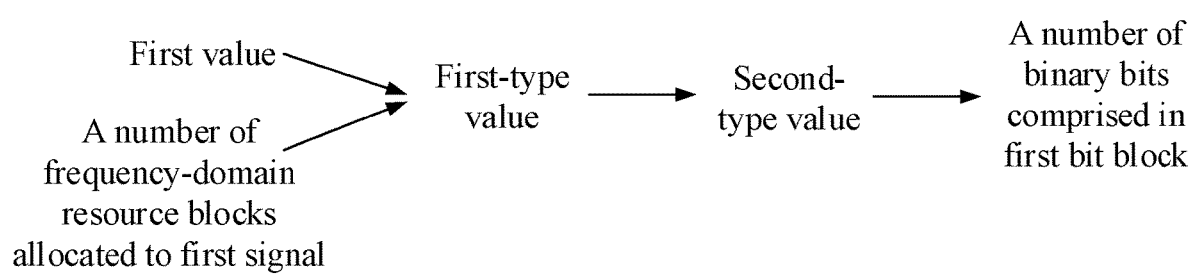
FIG. 15 illustrates a schematic diagram of relations among a first-type value, a second-type value and a number of binary bits comprised in a first bit block according to one embodiment of the present disclosure.

Embodiment 15 illustrates a schematic diagram of relations among a first-type value, a second-type value and a number of binary bits comprised in a first bit block according to one embodiment of the present disclosure; as shown in FIG. 15. In Embodiment 15, the first value and the number of the frequency-domain resource blocks allocated to the first signal are jointly used for determining the first-type value, the first-type value being used for determining the second-type value, and the second-type value being used for determining the number of binary bit(s) comprised in the first bit block.

In one embodiment, the frequency-domain resource block is a sub-channel.

In one embodiment, the frequency-domain resource block is a PRB.

In one embodiment, the frequency-domain resource block is a Resource Block (RB).

In one embodiment, the frequency-domain resource block is a subcarrier.

In one embodiment, the first-type value is a positive real number.

In one embodiment, the first-type value is a positive real number greater than 1.

In one embodiment, the first-type value is unrelated to the number of multicarrier symbols occupied by the first signal.

In one embodiment, the first value, the number of frequency-domain resource blocks occupied by the first signal and a size of time-frequency resources occupied by the first signaling are used for determining the first-type value.

In one embodiment, the first-type value increases along with the first value.

In one embodiment, the first-type value is linear with the first value, and a linear coefficient between the first-type value and the first value is a positive number.

In one embodiment, the first-type value increases with the growth of the number of the frequency-domain resource blocks allocated to the first signal.

In one embodiment, the first-type value is linear with the number of the frequency-domain resource blocks allocated to the first signal, and a linear coefficient between the first-type value and the number of the frequency-domain resource blocks allocated to the first signal is a positive number.

In one embodiment, the first-type value decreases as a number of REs occupied by the first signaling increases.

In one embodiment, the first-type value is linear with a number of REs occupied by the first signaling, and a linear coefficient between the first-type value and the number of REs occupied by the first signaling is negative.

In one embodiment, the first-type value is linear with a product of a second value and a first parameter; the second value is equal to a product of the first value and a first coefficient subtracted by a sixth overhead; the first parameter is a positive real number, and the first parameter is related to the number of the frequency-domain resource blocks allocated to the first signal, the sixth overhead being a non-negative real number.

In one subembodiment of the above embodiment, the linear coefficient between the first-type value and the product of the second value and the first parameter is 1.

In one subembodiment of the above embodiment, the first coefficient is fixed.

In one subembodiment of the above embodiment, the first coefficient is equal to 12.

In one subembodiment of the above embodiment, the first parameter is linear with the number of the frequency-domain resource blocks allocated to the first signal, and a linear coefficient between the first parameter and the number of the frequency-domain resource blocks allocated to the first signal is a positive number.

In one subembodiment of the above embodiment, the first parameter is equal to a product of the number of the frequency-domain resource blocks allocated to the first signal, a target code rate of the first signal, a modulation order of the first signal and a layer number of the first signal.

In one subembodiment of the above embodiment, the sixth overhead is a positive integer.

In one subembodiment of the above embodiment, part of the sixth overhead is configured by a higher layer signaling.

In one subembodiment of the above embodiment, the sixth overhead comprises a number of REs occupied by a DMRS of a PSSCH carrying the first signal in the frequency-domain resource block.

In one embodiment, the first-type value is linear with a first overhead, and a linear coefficient between the first-type value and the first overhead is a negative number; the first overhead is related to a size of time-frequency resources occupied by the first signaling, the first overhead being a non-negative real number.

In one subembodiment of the above embodiment, a linear coefficient between the first-type value and a first overhead is −1.

In one subembodiment of the above embodiment, the first overhead is a number of REs occupied by the first signaling.

In one subembodiment of the above embodiment, the first overhead is equal to a product of a number of REs occupied by the first signaling, a target code rate of the first signal, a modulation order of the first signal and a layer number of the first signal.

In one embodiment, the first-type value is equal to a product of the second value and the first parameter subtracted by the first overhead.

In one embodiment, the second-type value is a positive integer.

In one embodiment, the second-type value is a positive integer greater than 1.

In one embodiment, the second-type value is obtained by round-off and quantization of the first-type value.

In one embodiment, when the first-type value is equal to Q3, the second-type value is equal to P5; when the first-type value is equal to Q4, the second-type value is equal to P6; Q3 and Q4 are positive real numbers respectively, while P5 and P6 are positive integers respectively; the Q4 is greater than the Q3, and the P6 is no less than the P5.

In one embodiment, the first-type value is used for determining a first-type integer, while the second-type value is a maximum value between a second threshold and the first-type integer; the second threshold is a positive integer.

In one subembodiment of the above embodiment, the second threshold is related to the first-type value.

In one subembodiment of the above embodiment, the second threshold is equal to 24.

In one subembodiment of the above embodiment, the second threshold is equal to 3840.

In one subembodiment of the above embodiment, when the first-type value is less than or equal to 3824, the second threshold is equal to 24; when the first-type value is greater than 3824, the second threshold is equal to 3840.

Embodiment 16

Embodiment 16 illustrates a schematic diagram of a first value and a number of frequency-domain resource blocks allocated to a first signal being used for determining a first-type value according to one embodiment of the present disclosure; as shown in FIG. 16. In Embodiment 16, the first-type value is equal to a product of a fourth-type value and the first parameter in Embodiment 15 subtracted by a second overhead; the fourth-type value is a smaller value between a fifth-type value and a first threshold; the number of the frequency-domain resource blocks allocated to the first signal is used for determining the first parameter, and the first value is used for determining the fifth-type value; the second overhead is a non-negative real number.

In one embodiment, the first threshold is fixed.

In one embodiment, the first threshold is pre-defined.

In one embodiment, the first threshold is a positive integer greater than 1.

In one embodiment, the first threshold is 156.

In one embodiment, the fifth-type value is linear with the first value.

In one embodiment, a linear coefficient between the fifth-type value and the first value is fixed.

In one embodiment, a linear coefficient between the fifth-type value and the first value is 12.

In one embodiment, the fifth-type value is unrelated to a number of multicarrier symbols occupied by the first signal.

In one embodiment, the fifth-type value is linear with a third overhead, and a linear coefficient between the fifth-type value and the third overhead is equal to −1, the third overhead being a non-negative integer.

In one subembodiment of the above embodiment, the third overhead is configured by a higher layer signaling.

In one subembodiment of the above embodiment, the third overhead is configured by an RRC signaling.

In one subembodiment of the above embodiment, the third overhead is equal to 0.

In one subembodiment of the above embodiment, the third overhead is greater than 0.

In one subembodiment of the above embodiment, the third overhead is one of 0, 6, 12 and 18.

In one embodiment, the fifth-type value is linear with a fourth overhead, and a linear coefficient between the fifth-type value and the fourth overhead is equal to −1; the fourth overhead is related to a size of time-frequency resources occupied by a DMRS of a PSSCH carrying the first signal; the fourth overhead is a non-negative real number.

In one subembodiment of the above embodiment, the fourth overhead is a non-negative integer.

In one subembodiment of the above embodiment, the fourth overhead is equal to a number of REs occupied by a DMRS of a PSSCH carrying the first signal in the frequency-domain resource block.

In one subembodiment of the above embodiment, the first signaling is used for determining M1 DMRS Code Division Multiplexing (CDM) group(s), M1 being a positive integer; the fourth overhead is equal to a number of REs occupied by the M1 DMRS CDM group(s) in the frequency-domain resource block.

In one embodiment, the detailed definition of the DMRS CDM group can be found in 3GPP TS38.212 and 3GPP TS38.214.

In one embodiment, the fifth-type value is linear with a fifth overhead, and a linear coefficient between the fifth-type value and the fifth overhead is equal to −1; the fifth overhead is related to a size of time-frequency resources occupied by the first signaling; the fifth overhead is a non-negative real number.

In one subembodiment, the fifth overhead is equal to a number of REs occupied by the first signaling in the frequency-domain resource block.

In one embodiment, the second overhead is equal to 0.

In one embodiment, the second overhead is greater than 0.

In one embodiment, the second overhead is related to a size of time-frequency resources occupied by the first signaling.

In one embodiment, the second overhead is equal to a number of REs occupied by the first signaling.

In one embodiment, the second overhead is equal to a product of a number of REs occupied by the first signaling, a target code rate of the first signal, a modulation order of the first signal and a layer number of the first signal.

Embodiment 17

Embodiment 17 illustrates a schematic diagram of a first-type value being used for determining a second-type value according to one embodiment of the present disclosure; as shown in FIG. 17. In Embodiment 17, the second-type value is a larger value between the second threshold and a first-type integer in Embodiment 15, the first-type integer being a second-type reference integer in a second-type reference integer set that is most approximate to a reference value; the reference value is equal to a difference between the first-type value and a first bit number, the first bit number being a non-negative integer; the second-type reference integer set comprises multiple second-type reference integers, of which any second-type reference integer is a positive integral multiple of a second parameter, and the reference value is used for determining the second parameter, the second parameter being a positive integer.

In one embodiment, the second-type reference integer set is related to the first-type value.

In one embodiment, the first-type value is used for determining the second-type reference integer set.

In one embodiment, any second-type reference integer in the second-type reference integer set is no greater than the reference value.

In one embodiment, any positive integer no greater than the reference value and being a positive integral multiple of the second parameter is a second-type reference integer in the second-type reference integer set.

In one embodiment, when the first-type value is less than or equal to 3824, any positive integer no greater than the reference value and being a positive integral multiple of the second parameter is a second-type reference integer in the second-type reference integer set.

In one embodiment, any positive integer being a positive integral multiple of the second parameter is a second-type reference integer in the second-type reference integer set.

In one embodiment, when the first-type value is greater than 3824, any positive integer being a positive integral multiple of the second parameter is a second-type reference integer in the second-type reference integer set.

In one embodiment, an absolute value of a difference between a second-type reference integer in the second-type reference integer set different from the first-type integer and the reference value is larger than that of a difference between the first-type integer and the reference value.

In one embodiment, the first bit number is a non-negative integer.

In one embodiment, the first bit number is one of 0, 6, 11, 16 and 24.

In one embodiment, the first bit number is equal to 0.

In one embodiment, the first bit number is greater than 0.

In one embodiment, when the first-type value is no greater than 3824, the first bit number is 0.

In one embodiment, when the first-type value is greater than 3824, the first bit number is greater than 0.

In one embodiment, when the first-type value is greater than 3824, the first bit number is equal to 24.

In one embodiment, the second parameter is a positive integer power of 2.

In one embodiment, the second parameter is equal to $2^{max(3,\lfloor log_2(\text{first-type value})\rfloor-6)}$.

In one embodiment, when the first-type value is no greater than 3824, the second parameter is equal to $2^{max(3,\lfloor log_2(\text{first-type value})\rfloor-6)}$.

In one embodiment, the second parameter is equal to $2^{(\lfloor log_2(\text{first-type value}-\text{first bit number})\rfloor-5)}$.

In one embodiment, when the first-type value is greater than 3824, the second parameter is equal to $2^{(\lfloor log_2(\text{first-type value}-\text{first bit number})\rfloor-5)}$.

Embodiment 18

Figure 18:
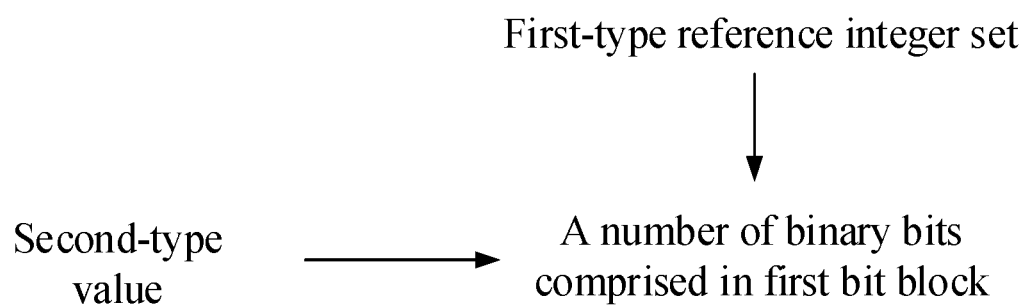
FIG. 18 illustrates a schematic diagram of a second-type value being used for determining a number of binary bits comprised in a first bit block according to one embodiment of the present disclosure.

Embodiment 18 illustrates a schematic diagram of a second-type value being used for determining a number of binary bits comprised in a first bit block according to one embodiment of the present disclosure; as shown in FIG. 18. In Embodiment 18, the number of binary bit(s) comprised in the first bit block is equal to a first-type reference integer in a first-type reference integer set no less than the second-type value and being most approximate to the second-type value; the first-type reference integer set comprises multiple first-type reference integers.

In one embodiment, an absolute value of a difference between any first-type reference integer in the first-type reference integer set, which is unequal to the number of binary bit(s) comprised in the first bit block and no less than the second-type value, and the second-type value is greater than that of a difference between the number of binary bit(s) comprised in the first bit block and the second-type value.

In one embodiment, the first-type value is less than or equal to 3824.

In one embodiment, any first-type reference integer in the first-type reference integer set is a positive integer.

In one embodiment, any first-type reference integer in the first-type reference integer set is a positive integer greater than 1.

In one embodiment, any first-type reference integer in the first-type reference integer set is a TBS.

In one embodiment, the first-type reference integer set comprises a TBS in Table 5.1.3.2-1 in 3GPP TS38.214 (V15.7.0).

In one embodiment, the first-type reference integer set comprises all TBSs in Table 5.1.3.2-1 in 3GPP TS38.214 (V15.7.0).

In one embodiment, the first-type reference integer set is composed by all TBSs in Table 5.1.3.2-1 in 3GPP TS38.214 (V15.7.0).

Embodiment 19

Figure 19:
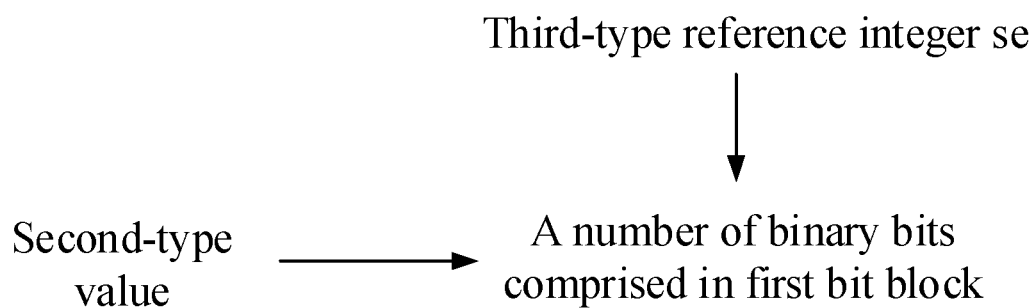
FIG. 19 illustrates a schematic diagram of a second-type value being used for determining a number of binary bits comprised in a first bit block according to one embodiment of the present disclosure.

Embodiment 19 illustrates a schematic diagram of a second-type value being used for determining a number of binary bits comprised in a first bit block according to one embodiment of the present disclosure; as shown in FIG. 19. In Embodiment 19, the number of binary bit(s) comprised in the first bit block is equal to a third-type reference integer in a third-type reference integer set no less than the second-type value and being most approximate to the second-type value, the third-type reference integer set comprising multiple third-type reference integers; a sum of any third-type reference integer comprised in the third-type reference integer set and a second bit number is a positive integral multiple of a fourth parameter, and the second-type value is used for determining the fourth parameter, the fourth parameter being a positive integer and the second bit number being a positive integer.

In one embodiment, the second-type value is greater than 3824.

In one embodiment, the second bit number is one of 6, 11, 16 and 24.

In one embodiment, the second bit number is 24.

In one embodiment, for any given positive integer, when a sum of the given positive integer and the second bit number is a positive integral multiple of the fourth parameter, the given positive integer is a third-type reference integer in the third-type reference integer set.

In one embodiment, a target code rate of the first signal is used for determining the fourth parameter.

In one embodiment, the fourth parameter is C time(s) as large as 8, C being a positive integer, and the second-type value being used for determining the C.

In one subembodiment, the C is equal to 1.

In one subembodiment, the C is greater than 1.

In one subembodiment, a target code rate of the first signal is used for determining the C.

In one subembodiment, when the target code rate of the first signal is no greater than ¼, $$C = \left\lceil \frac{\text{second} - \text{type value} + \text{second bit number}}{3816} \right\rceil.$$

In one subembodiment, when the target code rate of the first signal is greater than ¼ and the second-type value is greater than 8424, $$C = \left\lceil \frac{\text{second} - \text{type value} + \text{second bit number}}{8424} \right\rceil.$$

In one subembodiment, when the target code rate of the first signal is greater than ¼ and the second-type value is no greater than 8424, the C is equal to 1.

Embodiment 20

Figure 20:
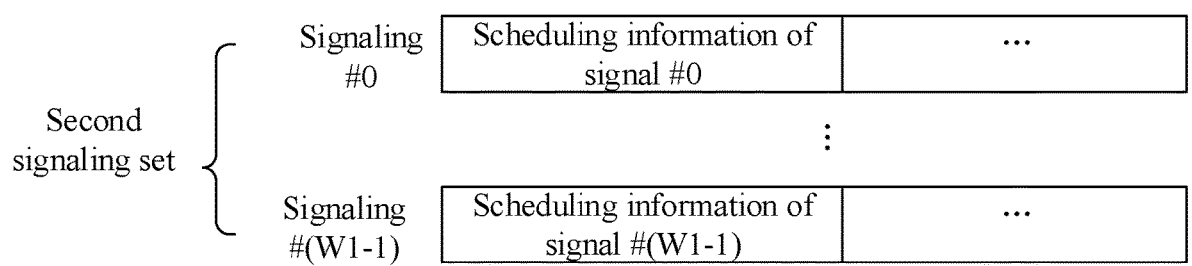
FIG. 20 illustrates a schematic diagram of a second signaling set and a second signal set according to one embodiment of the present disclosure.

Embodiment 20 illustrates a schematic diagram of a second signaling set and a second signal set according to one embodiment of the present disclosure; as shown in FIG. 20. In Embodiment 20, the second signaling set comprises W1 signalings, while the second signal set comprises W1 signals, W1 being a positive integer greater than 1; the W1 signalings respectively comprise scheduling information of the W1 signals. In FIG. 20, indexes of the W1 signalings and the W1 signals are #0, . . . and #(W1−1), respectively.

In one embodiment, any signaling in the second signaling set is a dynamic signaling.

In one embodiment, any signaling in the second signaling set is a Layer 1 (L1) signaling.

In one embodiment, any signaling in the second signaling set is a L1 control signaling.

In one embodiment, any signaling in the second signaling set comprises SCI.

In one embodiment, any signaling in the second signaling set comprises one or more fields in a piece of SCI.

In one embodiment, any signaling in the second signaling set is transmitted in Sidelink.

In one embodiment, any signaling in the second signaling set is transmitted via a PC5 interface.

In one embodiment, there is a signaling in the second signaling set that is transmitted via Unicast.

In one embodiment, there is a signaling in the second signaling set that is transmitted via Groupcast.

In one embodiment, there is a signaling in the second signaling set that is transmitted via Broadcast.

In one embodiment, any signal in the second signal set is a radio signal.

In one embodiment, any signal in the second signal set is a baseband signal.

In one embodiment, any signal in the second signal set is transmitted in SideLink.

In one embodiment, any signal in the second signal set is transmitted via a PC5 interface.

In one embodiment, there is a signal in the second signal set that is transmitted via Unicast.

In one embodiment, there is a signal in the second signal set that is transmitted via Groupcast.

In one embodiment, there is a signal in the second signal set that is transmitted via Broadcast.

In one embodiment, the first signaling and the second signaling set make up W2 signalings, while the first signal and the second signal set make up W2 signals, W2 being a positive integer greater than 1; a x-th signaling among the W2 signalings comprises scheduling information of a x-th signal among the W2 signals, x being any positive integer no greater than the W2.

In one subembodiment, a y-th signaling among the W2 signalings is used for reserving time-frequency resources occupied by a (y+1)-th signal among the W2 signals; y is a positive integer less than the W2.

In one subembodiment, a y-th signaling among the W2 signalings is used for reserving time-frequency resources occupied by signal(s) later than a y-th signal among the W2 signals; y is a positive integer less than the W2.

In one subembodiment, the W2 signals are W2 transmissions of the first bit block respectively.

In one embodiment, there is a signal in the second signal set that is earlier than the first signal in time domain.

In one embodiment, there is a signal in the second signal set that is later than the first signal in time domain.

Embodiment 21

Embodiment 21 illustrates a schematic diagram of a second signaling set and a second signal set according to one embodiment of the present disclosure; as shown in FIG. 21. In Embodiment 21, the second signaling set comprises only one signaling, and the second signal set comprises only one signal; the one signaling comprises scheduling information of the signal.

Embodiment 22

Figure 22:
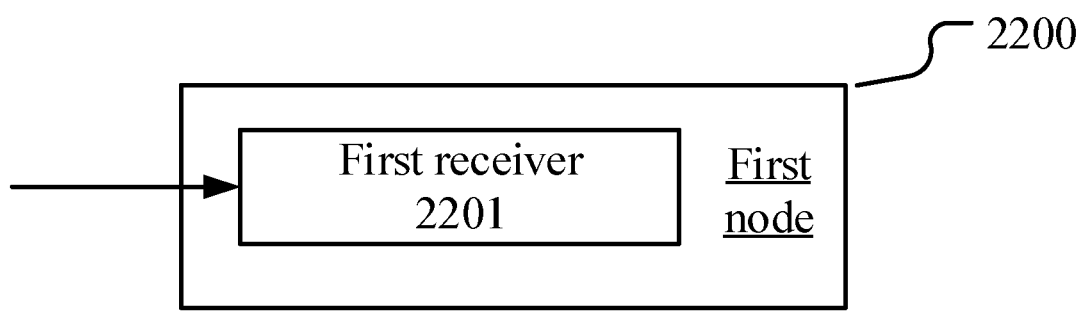
FIG. 22 illustrates a structure block diagram of a processing device in a first node according to one embodiment of the present disclosure.

Embodiment 22 illustrates a structure block diagram of a processing device in a first node according to one embodiment of the present disclosure; as shown in FIG. 22. In FIG. 22, a first node's processing device 2200 comprises a first receiver 2201.

In Embodiment 22, a first receiver 2201 receives a first signaling and a first signal in a first time-frequency resource pool.

In Embodiment 22, the first signaling comprises scheduling information of the first signal; the first signal carries a first bit block, the first bit block comprising a positive integer number of binary bits; a first value is used for determining a number of binary bits comprised in the first bit block, and the first value is related to the first time-frequency resource pool.

In one embodiment, the first time-frequency resource pool is a candidate time-frequency resource pool among K candidate time-frequency resource pools, K being a positive integer greater than 1; K value sets respectively correspond to the K candidate time-frequency resource pools, any of the K value sets comprising a positive integer number of value(s); a first value set is one of the K value sets that corresponds to the first time-frequency resource pool, the first value being a value in the first value set.

In one embodiment, a cast type of the first signal is used for determining the first value.

In one embodiment, a priority of the first signal is used for determining the first value.

In one embodiment, the first receiver 2201 receives a first information block; herein, the first information block indicates the first time-frequency resource pool.

In one embodiment, the first value and a number of frequency-domain resource blocks allocated to the first signal are jointly used for determining a first-type value, wherein the first-type value is used for determining a second-type value, and the second-type value is used for determining the number of the binary bits comprised in the first bit block.

In one embodiment, the first receiver 2201 receives a second signaling set and a second signal set in the first time-frequency resource pool; herein, the second signaling set comprises a positive integer number of signaling(s), and the second signal set comprises a positive integer number of signal(s); each signaling in the second signaling set comprises scheduling information of a signal in the second signal set, while each signal in the second signal set carries the first bit block.

In one embodiment, the first node is a UE.

In one embodiment, the first node is a relay node.

In one embodiment, the first receiver 2201 comprises at least one of the antenna 452, the receiver 454, the receiving processor 456, the multi-antenna receiving processor 458, the controller/processor 459, the memory 460 or the data source 467 in Embodiment 4.

Embodiment 23

Figure 23:
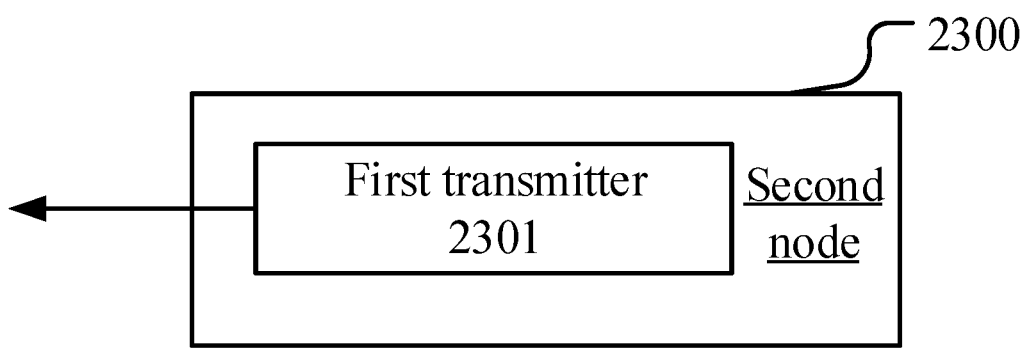
FIG. 23 illustrates a structure block diagram of a processing device in a second node according to one embodiment of the present disclosure.

Embodiment 23 illustrates a structure block diagram of a processing device in a second node according to one embodiment of the present disclosure; as shown in FIG. 23. In FIG. 23, a second node's processing device 2300 comprises a first transmitter 2301.

In Embodiment 23, a first transmitter 2301 transmits a first signaling and a first signal in a first time-frequency resource pool.

In Embodiment 23, the first signaling comprises scheduling information of the first signal; the first signal carries a first bit block, the first bit block comprising a positive integer number of binary bits; a first value is used for determining a number of binary bits comprised in the first bit block, and the first value is related to the first time-frequency resource pool.

In one embodiment, the first time-frequency resource pool is a candidate time-frequency resource pool among K candidate time-frequency resource pools, K being a positive integer greater than 1; K value sets respectively correspond to the K candidate time-frequency resource pools, any of the K value sets comprising a positive integer number of value(s); a first value set is one of the K value sets that corresponds to the first time-frequency resource pool, the first value being a value in the first value set.

In one embodiment, a cast type of the first signal is used for determining the first value.

In one embodiment, a priority of the first signal is used for determining the first value.

In one embodiment, the first transmitter 2301 transmits a first information block; herein, the first information block indicates the first time-frequency resource pool.

In one embodiment, the first value and a number of frequency-domain resource blocks allocated to the first signal are jointly used for determining a first-type value, wherein the first-type value is used for determining a second-type value, and the second-type value is used for determining the number of the binary bits comprised in the first bit block.

In one embodiment, the first transmitter 2301 transmits a second signaling set and a second signal set in the first time-frequency resource pool; herein, the second signaling set comprises a positive integer number of signaling(s), and the second signal set comprises a positive integer number of signal(s); each signaling in the second signaling set comprises scheduling information of a signal in the second signal set, while each signal in the second signal set carries the first bit block.

In one embodiment, the second node is a UE.

In one embodiment, the second node is a relay node.

In one embodiment, the first transmitter 2301 comprises at least one of the antenna 420, the transmitter 418, the transmitting processor 416, the multi-antenna transmitting processor 471, the controller/processor 475 or the memory 476 in Embodiment 4.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The UE or terminal includes but is not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things (IOT), RFID terminals, NB-IOT terminals, Machine Type Communication (MTC) terminals, enhanced MTC (eMTC) terminals, data cards, low-cost mobile phones, low-cost tablet computers, etc. The base station or system equipment in the present disclosure includes but is not limited to macro-cellular base stations, micro-cellular base stations, home base stations, relay base station, gNB (NR node B), Transmitter Receiver Point (TRP), and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A first node used for wireless communications, comprising: a first receiver, receiving a first signaling and a first signal in a first time-frequency resource pool; wherein the first signaling comprises scheduling information of the first signal, the scheduling information comprising one or more of occupied time-domain resources, occupied frequency-domain resources, a Modulation and Coding Scheme (MCS), configuration information of a DMRS, a HARQ process number, a Redundancy Version (RV) or a New Data Indicator (NDI); the first signal carries a first bit block, the first bit block comprising a positive integer number of binary bits; a first value is used for determining a number of binary bits comprised in the first bit block, and the first value is related to the first time-frequency resource pool; the first value is a positive integer; a unit of the first value is a multicarrier symbol; the first bit block comprises a Transport Block (TB), and the number of binary bits comprised in the first bit block is a Transport Block Size (TBS); a number of frequency-domain resource blocks allocated to the first signal and the first value are jointly used for determining a first-type value, wherein the first-type value is used for determining a second-type value, and the second-type value is used for determining the number of the binary bits comprised in the first bit block; the first-type value is equal to a product of a second value and a first parameter subtracted by a first overhead; the second value is equal to a product of the first value and a first coefficient subtracted by a sixth overhead, the first coefficient being equal to 12; the first parameter is a positive real number, and the first parameter is a product of the number of frequency-domain resource blocks allocated to the first signal, a target code rate of the first signal, a modulation order of the first signal and a number of layers of the first signal; the sixth overhead is a non-negative real number, the sixth overhead comprises a number of REs occupied by DMRS of a PSSCH carrying the first signal in one of the said frequency-domain resource block; the first overhead is a non-negative real number, and the first overhead is related to a size of time-frequency resources occupied by the first signaling; when the first-type value is equal to Q3, the second-type value is equal to P5; when the first-type value is equal to Q4, the second-type value is equal to P6; Q3 and Q4 are positive real numbers respectively, while P5 and P6 are positive integers respectively; the Q4 is greater than the Q3, and the P6 is no less than the P5.

2. The first node according to claim 1, wherein the first time-frequency resource pool is a candidate time-frequency resource pool among K candidate time-frequency resource pools, K being a positive integer greater than 1; K value sets respectively correspond to the K candidate time-frequency resource pools, any of the K value sets comprising a positive integer number of value(s); a first value set is one of the K value sets that corresponds to the first time-frequency resource pool, the first value being a value in the first value set; or, the first time-frequency resource pool is a candidate time-frequency resource pool among K candidate time-frequency resource pools, K being a positive integer greater than 1; K value sets respectively correspond to the K candidate time-frequency resource pools, any of the K value sets comprising a positive integer number of value(s); a first value set is one of the K value sets that corresponds to the first time-frequency resource pool, the first value being a value in the first value set, the first value set comprises multiple values, and the first signaling indicates the first value from the first value set.

3. The first node according to claim 1, wherein time-frequency resources in the first time-frequency resource pool are reserved for sidelink; or, the first signaling comprises SCI, the first signal is transmitted on a PSSCH; or, the first value is related to whether a target receiver of the first signal is required to send a HARQ-ACK for the first bit block.

4. The first node according to claim 1, wherein the first receiver receives a first information block, wherein the first information block indicates the first time-frequency resource pool; or, the number of binary bits comprised in the first bit block is equal to a first-type reference integer in a first-type reference integer set closest to and no less than the second-type value; the first-type reference integer set comprises multiple first-type reference integers, and any first-type reference integer in the first-type reference integer set is a TBS.

5. The first node according to claim 1, wherein the first-type value is used for determining a first-type integer, while the second-type value is a maximum value between a second threshold and the first-type integer; the second threshold is a positive integer; when the first-type value is less than or equal to 3824, the second threshold is equal to 24; when the first-type value is greater than 3824, the second threshold is equal to 3840.

6. A second node used for wireless communications, comprising: a first transmitter, transmitting a first signaling and a first signal in a first time-frequency resource pool; wherein the first signaling comprises scheduling information of the first signal, the scheduling information comprising one or more of occupied time-domain resources, occupied frequency-domain resources, a Modulation and Coding Scheme (MCS), configuration information of a DMRS, a HARQ process number, a Redundancy Version (RV) or a New Data Indicator (NDI); the first signal carries a first bit block, the first bit block comprising a positive integer number of binary bits; a first value is used for determining a number of binary bits comprised in the first bit block, and the first value is related to the first time-frequency resource pool; the first value is a positive integer; a unit of the first value is a multicarrier symbol; the first bit block comprises a Transport Block (TB), and the number of binary bits comprised in the first bit block is a Transport Block Size (TBS); a number of frequency-domain resource blocks allocated to the first signal and the first value are jointly used for determining a first-type value, wherein the first-type value is used for determining a second-type value, and the second-type value is used for determining the number of the binary bits comprised in the first bit block; the first-type value is equal to a product of a second value and a first parameter subtracted by a first overhead; the second value is equal to a product of the first value and a first coefficient subtracted by a sixth overhead, the first coefficient being equal to 12; the first parameter is a positive real number, and the first parameter is a product of the number of frequency-domain resource blocks allocated to the first signal, a target code rate of the first signal, a modulation order of the first signal and a number of layers of the first signal; the sixth overhead is a non-negative real number, the sixth overhead comprises a number of REs occupied by DMRS of a PSSCH carrying the first signal in one of the said frequency-domain resource block; the first overhead is a non-negative real number, and the first overhead is related to a size of time-frequency resources occupied by the first signaling; when the first-type value is equal to Q3, the second-type value is equal to P5; when the first-type value is equal to Q4, the second-type value is equal to P6; Q3 and Q4 are positive real numbers respectively, while P5 and P6 are positive integers respectively; the Q4 is greater than the Q3, and the P6 is no less than the P5.

7. The second node according to claim 6, wherein the first time-frequency resource pool is a candidate time-frequency resource pool among K candidate time-frequency resource pools, K being a positive integer greater than 1; K value sets respectively correspond to the K candidate time-frequency resource pools, any of the K value sets comprising a positive integer number of value(s); a first value set is one of the K value sets that corresponds to the first time-frequency resource pool, the first value being a value in the first value set; or, the first time-frequency resource pool is a candidate time-frequency resource pool among K candidate time-frequency resource pools, K being a positive integer greater than 1; K value sets respectively correspond to the K candidate time-frequency resource pools, any of the K value sets comprising a positive integer number of value(s); a first value set is one of the K value sets that corresponds to the first time-frequency resource pool, the first value being a value in the first value set, the first value set comprises multiple values, and the first signaling indicates the first value from the first value set.

8. The second node according to claim 6, wherein time-frequency resources in the first time-frequency resource pool are reserved for sidelink; or, the first signaling comprises SCI, the first signal is transmitted on a PSSCH; or, the first value is related to whether a target receiver of the first signal is required to send a HARQ-ACK for the first bit block.

9. The second node according to claim 6, wherein the first transmitter transmits a first information block, wherein the first information block indicates the first time-frequency resource pool; or, the number of binary bits comprised in the first bit block is equal to a first-type reference integer in a first-type reference integer set closest to and no less than the second-type value; the first-type reference integer set comprises multiple first-type reference integers, and any first-type reference integer in the first-type reference integer set is a TBS.

10. The second node according to claim 6, wherein the first-type value is used for determining a first-type integer, while the second-type value is a maximum value between a second threshold and the first-type integer; the second threshold is a positive integer; when the first-type value is less than or equal to 3824, the second threshold is equal to 24; when the first-type value is greater than 3824, the second threshold is equal to 3840.

11. A method in a first node used for wireless communications, comprising: receiving a first signaling in a first time-frequency resource pool; and receiving a first signal in the first time-frequency resource pool; wherein the first signaling comprises scheduling information of the first signal, the scheduling information comprising one or more of occupied time-domain resources, occupied frequency-domain resources, a Modulation and Coding Scheme (MCS), configuration information of a DMRS, a HARQ process number, a Redundancy Version (RV) or a New Data Indicator (NDI); the first signal carries a first bit block, the first bit block comprising a positive integer number of binary bits; a first value is used by the first node for determining a number of binary bits comprised in the first bit block, and the first value is related to the first time-frequency resource pool; the first value is a positive integer; a unit of the first value is a multicarrier symbol; the first bit block comprises a Transport Block (TB), and the number of binary bits comprised in the first bit block is a Transport Block Size (TBS); a number of frequency-domain resource blocks allocated to the first signal and the first value are jointly used by the first node for determining a first-type value, wherein the first-type value is used by the first node for determining a second-type value, and the second-type value is used by the first node for determining the number of the binary bits comprised in the first bit block; the first-type value is equal to a product of a second value and a first parameter subtracted by a first overhead; the second value is equal to a product of the first value and a first coefficient subtracted by a sixth overhead, the first coefficient being equal to 12; the first parameter is a positive real number, and the first parameter is a product of the number of frequency-domain resource blocks allocated to the first signal, a target code rate of the first signal, a modulation order of the first signal and a number of layers of the first signal; the sixth overhead is a non-negative real number, the sixth overhead comprises a number of REs occupied by DMRS of a PSSCH carrying the first signal in one of the said frequency-domain resource block; the first overhead is a non-negative real number, and the first overhead is related to a size of time-frequency resources occupied by the first signaling; when the first-type value is equal to Q3, the second-type value is equal to P5; when the first-type value is equal to Q4, the second-type value is equal to P6; Q3 and Q4 are positive real numbers respectively, while P5 and P6 are positive integers respectively; the Q4 is greater than the Q3, and the P6 is no less than the P5.

12. The method according to claim 11, wherein the first time-frequency resource pool is a candidate time-frequency resource pool among K candidate time-frequency resource pools, K being a positive integer greater than 1; K value sets respectively correspond to the K candidate time-frequency resource pools, any of the K value sets comprising a positive integer number of value(s); a first value set is one of the K value sets that corresponds to the first time-frequency resource pool, the first value being a value in the first value set; or, the first time-frequency resource pool is a candidate time-frequency resource pool among K candidate time-frequency resource pools, K being a positive integer greater than 1; K value sets respectively correspond to the K candidate time-frequency resource pools, any of the K value sets comprising a positive integer number of value(s); a first value set is one of the K value sets that corresponds to the first time-frequency resource pool, the first value being a value in the first value set, the first value set comprises multiple values, and the first signaling indicates the first value from the first value set.

13. The method according to claim 11, wherein time-frequency resources in the first time-frequency resource pool are reserved for sidelink; or, the first signaling comprises SCI, the first signal is transmitted on a PSSCH; or, the first value is related to whether a target receiver of the first signal is required to send a HARQ-ACK for the first bit block.

14. The method according to claim 11, wherein the number of binary bits comprised in the first bit block is equal to a first-type reference integer in a first-type reference integer set closest to and no less than the second-type value; the first-type reference integer set comprises multiple first-type reference integers, and any first-type reference integer in the first-type reference integer set is a TB S; or, comprising: receiving a first information block, wherein the first information block indicates the first time-frequency resource pool.

15. The method according to claim 11, wherein the first-type value is used for determining a first-type integer, while the second-type value is a maximum value between a second threshold and the first-type integer; the second threshold is a positive integer; when the first-type value is less than or equal to 3824, the second threshold is equal to 24; when the first-type value is greater than 3824, the second threshold is equal to 3840.

16. A method in a second node used for wireless communications, comprising: transmitting a first signaling in a first time-frequency resource pool; and transmitting a first signal in the first time-frequency resource pool; wherein the first signaling comprises scheduling information of the first signal, the scheduling information comprising one or more of occupied time-domain resources, occupied frequency-domain resources, a Modulation and Coding Scheme (MCS), configuration information of a DMRS, a HARQ process number, a Redundancy Version (RV) or a New Data Indicator (NDI); the first signal carries a first bit block, the first bit block comprising a positive integer number of binary bits; a first value is used by a target receiver of the first signaling for determining a number of binary bits comprised in the first bit block, and the first value is related to the first time-frequency resource pool; the first value is a positive integer; a unit of the first value is a multicarrier symbol; the first bit block comprises a Transport Block (TB), and the number of binary bits comprised in the first bit block is a Transport Block Size (TBS); a number of frequency-domain resource blocks allocated to the first signal and the first value are jointly used by the target receiver of the first signaling for determining a first-type value, wherein the first-type value is used for determining a second-type value, and the second-type value is used by the target receiver of the first signaling for determining the number of the binary bits comprised in the first bit block; the first-type value is equal to a product of a second value and a first parameter subtracted by a first overhead; the second value is equal to a product of the first value and a first coefficient subtracted by a sixth overhead, the first coefficient being equal to 12; the first parameter is a positive real number, and the first parameter is a product of the number of frequency-domain resource blocks allocated to the first signal, a target code rate of the first signal, a modulation order of the first signal and a number of layers of the first signal; the sixth overhead is a non-negative real number, the sixth overhead comprises a number of REs occupied by DMRS of a PSSCH carrying the first signal in one of the said frequency-domain resource block; the first overhead is a non-negative real number, and the first overhead is related to a size of time-frequency resources occupied by the first signaling; when the first-type value is equal to Q3, the second-type value is equal to P5; when the first-type value is equal to Q4, the second-type value is equal to P6; Q3 and Q4 are positive real numbers respectively, while P5 and P6 are positive integers respectively; the Q4 is greater than the Q3, and the P6 is no less than the P5.

17. The method according to claim 16, wherein the first time-frequency resource pool is a candidate time-frequency resource pool among K candidate time-frequency resource pools, K being a positive integer greater than 1; K value sets respectively correspond to the K candidate time-frequency resource pools, any of the K value sets comprising a positive integer number of value(s); a first value set is one of the K value sets that corresponds to the first time-frequency resource pool, the first value being a value in the first value set; or, the first time-frequency resource pool is a candidate time-frequency resource pool among K candidate time-frequency resource pools, K being a positive integer greater than 1; K value sets respectively correspond to the K candidate time-frequency resource pools, any of the K value sets comprising a positive integer number of value(s); a first value set is one of the K value sets that corresponds to the first time-frequency resource pool, the first value being a value in the first value set, the first value set comprises multiple values, and the first signaling indicates the first value from the first value set.

18. The method according to claim 16, wherein time-frequency resources in the first time-frequency resource pool are reserved for sidelink; or, the first signaling comprises SCI, the first signal is transmitted on a PSSCH; or, the first value is related to whether a target receiver of the first signal is required to send a HARQ-ACK for the first bit block.

19. The method according to claim 16, wherein the number of binary bits comprised in the first bit block is equal to a first-type reference integer in a first-type reference integer set closest to and no less than the second-type value; the first-type reference integer set comprises multiple first-type reference integers, and any first-type reference integer in the first-type reference integer set is a TBS; or, comprising: transmitting a first information block, wherein the first information block indicates the first time-frequency resource pool.

20. The method according to claim 16, wherein the first-type value is used for determining a first-type integer, while the second-type value is a maximum value between a second threshold and the first-type integer; the second threshold is a positive integer; when the first-type value is less than or equal to 3824, the second threshold is equal to 24; when the first-type value is greater than 3824, the second threshold is equal to 3840.

* * * * *